(12) United States Patent
Li et al.

(10) Patent No.: US 11,917,165 B2
(45) Date of Patent: Feb. 27, 2024

(54) MMVD SIGNALING IMPROVEMENT

(71) Applicant: Tencent America LLC, Palo Alto, CA (US)

(72) Inventors: Xiang Li, Saratoga, CA (US); Lien-Fei Chen, Hsinchu (TW); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/888,193

(22) Filed: Aug. 15, 2022

(65) Prior Publication Data

US 2023/0054289 A1 Feb. 23, 2023

Related U.S. Application Data

(60) Provisional application No. 63/233,490, filed on Aug. 16, 2021.

(51) Int. Cl.
| | |
|---|---|
| *H04N 19/159* | (2014.01) |
| *H04N 19/105* | (2014.01) |
| *H04N 19/46* | (2014.01) |
| *H04N 19/172* | (2014.01) |
| *H04N 19/573* | (2014.01) |
| *H04N 19/139* | (2014.01) |
| *H04N 19/13* | (2014.01) |

(Continued)

(52) U.S. Cl.
CPC ......... *H04N 19/159* (2014.11); *H04N 19/105* (2014.11); *H04N 19/13* (2014.11); *H04N 19/139* (2014.11); *H04N 19/172* (2014.11); *H04N 19/176* (2014.11); *H04N 19/46* (2014.11); *H04N 19/513* (2014.11); *H04N 19/573* (2014.11)

(58) Field of Classification Search
CPC .... H04N 19/159; H04N 19/105; H04N 19/13; H04N 19/139; H04N 19/172; H04N 19/176; H04N 19/46; H04N 19/513; H04N 19/573; H04N 19/174; H04N 19/577

See application file for complete search history.

(56) References Cited

U.S. PATENT DOCUMENTS

2021/0368180 A1* 11/2021 Park ................... H04N 19/139
2022/0046272 A1* 2/2022 Zhang ................ H04N 19/159

(Continued)

*Primary Examiner* — Dramos Kalapodas
(74) *Attorney, Agent, or Firm* — ARENTFOX SCHIFF LLP

(57) ABSTRACT

Aspects of the disclosure provide a method and an apparatus for video decoding. The apparatus includes processing circuitry receiving prediction information of a plurality of blocks in a current picture from a coded video bitstream. The processing circuitry determines, based on the prediction information, whether at least one of a decoder-side motion vector refinement (DMVR) mode or a bi-directional optical flow (BDOF) mode is allowed for the plurality of blocks. If the DMVR mode or the BDOF mode is allowed for the plurality of blocks, the processing circuitry determines that a plurality of merge with motion vector difference (MMVD) merge flags indicating whether a MMVD mode is applied to the plurality of blocks, respectively, is inferred as false for the plurality of blocks. If the plurality of MMVD merge flags is inferred as false, the processing circuitry reconstructs each block in the plurality of blocks without applying the MMVD mode.

20 Claims, 16 Drawing Sheets

(51) Int. Cl.
*H04N 19/513* (2014.01)
*H04N 19/176* (2014.01)

(56) References Cited

U.S. PATENT DOCUMENTS

| | | | | |
|---|---|---|---|---|
| 2022/0224911 A1* | 7/2022 | Park | ..................... | H04N 19/159 |
| 2022/0295091 A1* | 9/2022 | Chujoh | .................. | H04N 19/70 |
| 2023/0143900 A1* | 5/2023 | Chujoh | ................ | H04N 19/105 |
| | | | | 375/240.12 |
| 2023/0147701 A1* | 5/2023 | Chujoh | ................ | H04N 19/176 |
| | | | | 375/240.16 |

* cited by examiner

MMVD SIGNALING IMPROVEMENT

INCORPORATION BY REFERENCE

The present disclosure claims the benefit of priority to U.S. Provisional Application No. 63/233,490, "Merge with Motion Vector Difference Signaling Improvement" filed on Aug. 16, 2021, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Uncompressed digital images and/or video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed image and/or video has specific bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of image and/or video coding and decoding can be the reduction of redundancy in the input image and/or video signal, through compression. Compression can help reduce the aforementioned bandwidth and/or storage space requirements, in some cases by two orders of magnitude or more. Although the descriptions herein use video encoding/decoding as illustrative examples, the same techniques can be applied to image encoding/decoding in similar fashion without departing from the spirit of the present disclosure. Both lossless compression and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform processing, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding used in, for example, MPEG-2 generation coding technologies, does not use intra prediction. However, some newer video compression technologies include techniques that attempt to perform prediction based on, for example, surrounding sample data and/or metadata obtained during the encoding and/or decoding of blocks of data. Such techniques are henceforth called "intra prediction" techniques. Note that in at least some cases, intra prediction is using reference data only from the current picture under reconstruction and not from reference pictures.

There can be many different forms of intra prediction. When more than one of such techniques can be used in a given video coding technology, the specific technique in use can be coded as a specific intra prediction mode that uses the specific technique. In certain cases, intra prediction modes can have submodes and/or parameters, where the submodes and/or parameters can be coded individually or included in a mode codeword, which defines the prediction mode being used. Which codeword to use for a given mode, submode, and/or parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values of already available samples. Sample values of neighboring samples are copied into the predictor block according to a direction. A reference to the direction in use can be coded in the bitstream or may itself be predicted.

Referring to FIG. 1A, depicted in the lower right is a subset of nine predictor directions known from the 33 possible predictor directions (corresponding to the 33 angular modes of the 35 intra modes) defined in H.265. The point where the arrows converge (101) represents the sample being predicted. The arrows represent the direction from which the sample is being predicted. For example, arrow (102) indicates that sample (101) is predicted from a sample or samples to the upper right, at a 45 degree angle from the horizontal. Similarly, arrow (103) indicates that sample (101) is predicted from a sample or samples to the lower left of sample (101), in a 22.5 degree angle from the horizontal.

Still referring to FIG. 1A, on the top left there is depicted a square block (104) of 4×4 samples (indicated by a dashed, boldface line). The square block (104) includes 16 samples, each labelled with an "S", its position in the Y dimension (e.g., row index) and its position in the X dimension (e.g., column index). For example, sample S21 is the second sample in the Y dimension (from the top) and the first (from the left) sample in the X dimension. Similarly, sample S44 is the fourth sample in block (104) in both the Y and X dimensions. As the block is 4×4 samples in size, S44 is at the bottom right. Further shown are reference samples that follow a similar numbering scheme. A reference sample is labelled with an R, its Y position (e.g., row index) and X position (column index) relative to block (104). In both H.264 and H.265, prediction samples neighbor the block under reconstruction; therefore, no negative values need to be used.

Intra picture prediction can work by copying reference sample values from the neighboring samples indicated by the signaled prediction direction. For example, assume the coded video bitstream includes signaling that, for this block, indicates a prediction direction consistent with arrow (102)—that is, samples are predicted from samples to the upper right, at a 45 degree angle from the horizontal. In that case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially when the directions are not evenly divisible by 45 degrees.

The number of possible directions has increased as video coding technology has developed. In H.264 (year 2003), nine different direction could be represented. That increased to 33 in H.265 (year 2013). Currently, JEM/VVC/BMS can support up to 65 directions. Experiments have been conducted to identify the most likely directions, and certain techniques in the entropy coding are used to represent those likely directions in a small number of bits, accepting a certain penalty for less likely directions. Further, the directions themselves can sometimes be predicted from neighboring directions used in neighboring, already decoded, blocks.

FIG. 1B shows a schematic (110) that depicts 65 intra prediction directions according to JEM to illustrate the increasing number of prediction directions over time.

The mapping of intra prediction direction bits that represent the direction in the coded video bitstream can be different from video coding technology to video coding technology. Such mapping can range, for example, from simple direct mappings, to codewords, to complex adaptive schemes involving most probable modes, and similar techniques. In most cases, however, there can be certain directions that are statistically less likely to occur in video content than certain other directions. As the goal of video compression is the reduction of redundancy, those less likely directions will, in a well working video coding technology, be represented by a larger number of bits than more likely directions.

Image and/or video coding and decoding can be performed using inter-picture prediction with motion compensation. Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described with reference to FIG. 2 is a technique henceforth referred to as "spatial merge".

Referring to FIG. 2, a current block (201) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B1, B1, B2 (202 through 206, respectively). In H.265, the MV prediction can use predictors from the same reference picture that the neighboring block is using.

SUMMARY

Aspects of the disclosure provide methods and apparatuses for video encoding and decoding. In some examples, an apparatus for video decoding includes processing circuitry. The processing circuitry is configured to receive prediction information of a plurality of blocks in a current picture from a coded video bitstream. The processing circuitry determines, based on the prediction information, whether at least one of a decoder-side motion vector refinement (DMVR) mode or a bi-directional optical flow (BDOF) mode is allowed for the plurality of blocks. In response to a determination that the at least one of the DMVR mode or the BDOF mode is allowed for the plurality of blocks, the processing circuitry determines that a plurality of merge with motion vector difference (MMVD) merge flags is inferred as false for the plurality of blocks. The plurality of MMVD merge flags indicates whether a MMVD mode is applied to the plurality of blocks, respectively. In response to a determination that the plurality of MMVD merge flags is inferred as false for the plurality of blocks, the processing circuitry reconstructs each block in the plurality of blocks without applying the MMVD mode.

In an embodiment, the prediction information includes at least one flag indicating whether the at least one of the DMVR mode or the BDOF mode is allowed for the plurality of blocks.

In an example, the processing circuitry determines that (i) the current picture refers to a forward reference picture and a backward reference picture, and (ii) the current picture is in the middle of the forward reference picture and the backward reference picture. The processing circuitry determines that the plurality of MMVD merge flags is not signaled and infers the plurality of MMVD merge flags based on a determination that the MMVD mode is not allowed in the current picture.

In an example, the processing circuitry determines that an absolute value of a first picture order count (POC) difference between the forward reference picture and the current picture is equal to an absolute value of a second POC difference between the backward reference picture and the current picture. For example, the absolute value of the first POC difference and the absolute value of the second POC difference are less than a threshold.

In an embodiment, the prediction information includes a MMVD merge enabling flag of the plurality of blocks, the MMVD merge enabling flag indicates that the MMVD mode is not enabled for the plurality of blocks, and the processing circuitry determines that the plurality MMVD merge flags of the plurality of blocks is inferred as false.

In an example, the plurality of blocks is a slice in the current picture.

In an embodiment, in response to a determination that the plurality of MMVD merge flags is not inferred as false for the plurality of blocks, a respective MMVD merge flag of each block in the plurality of blocks is signaled in the coded video bitstream. The processing circuitry can select a context among a first context and a second context based on whether one or more of the DMVR mode or the BDOF mode is allowed for the plurality of blocks. The processing circuitry can decode the respective MMVD merge flag of each block in the plurality of blocks using context-adaptive binary arithmetic coding (CABAC) with the selected context.

In an embodiment, the prediction information indicates whether conditions to select the first context are met. The conditions include the one or more of the DMVR mode or the BDOF mode is allowed for the plurality of blocks, reference pictures of the plurality of blocks include a forward reference picture and a backward reference picture, and an absolute value of a first picture order count (POC) difference between the forward reference picture and the current picture is equal to an absolute value of a second POC difference between the backward reference picture and the current picture. The processing circuitry can select the first context as the context based on the conditions being satisfied. The processing circuitry can select the second context as the context based on one of the conditions not being satisfied.

In an embodiment, the first context is initialized with a probability indicating that the MMVD merge flag of each block in the plurality of blocks has a probability to be false that is higher than a probability that the MMVD merge flag is true.

Aspects of the disclosure also provide a non-transitory computer-readable storage medium storing a program executable by at least one processor to perform the methods for video decoding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1A:
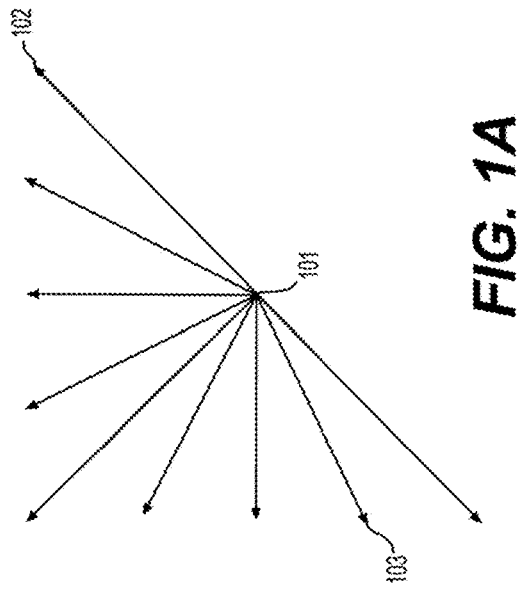
FIG. 1A is a schematic illustration of an exemplary subset of intra prediction modes.
Figure 1B:
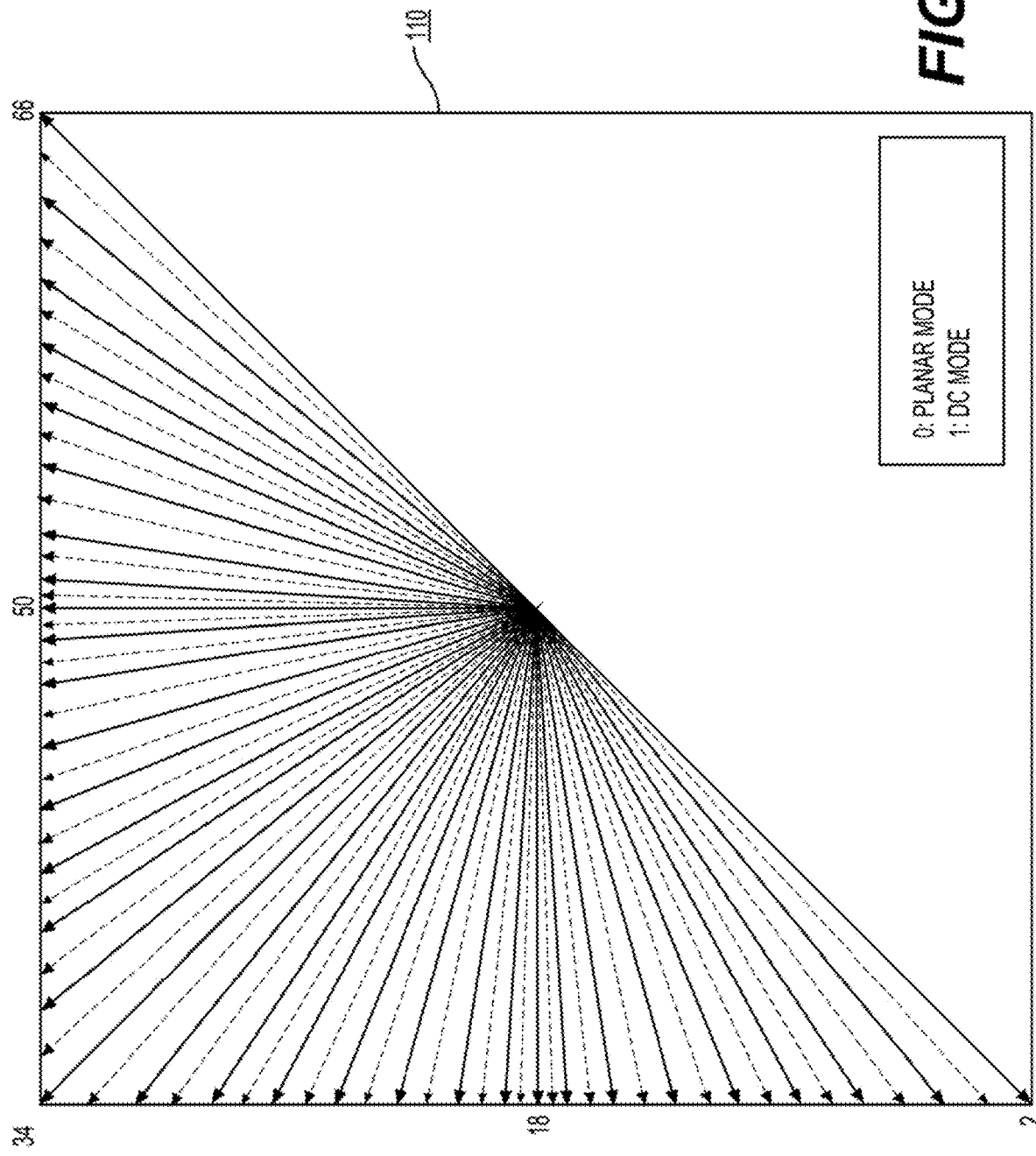
FIG. 1B is an illustration of exemplary intra prediction directions.
Figure 2:
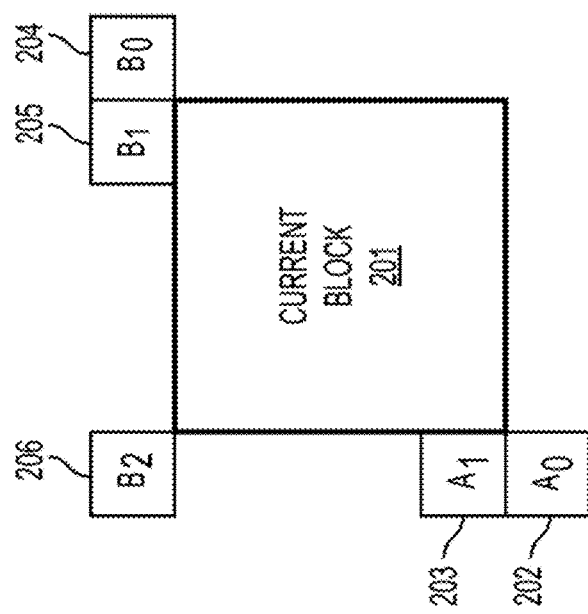
FIG. 2 shows an example of a current block (201) and surrounding samples.
Figure 3:
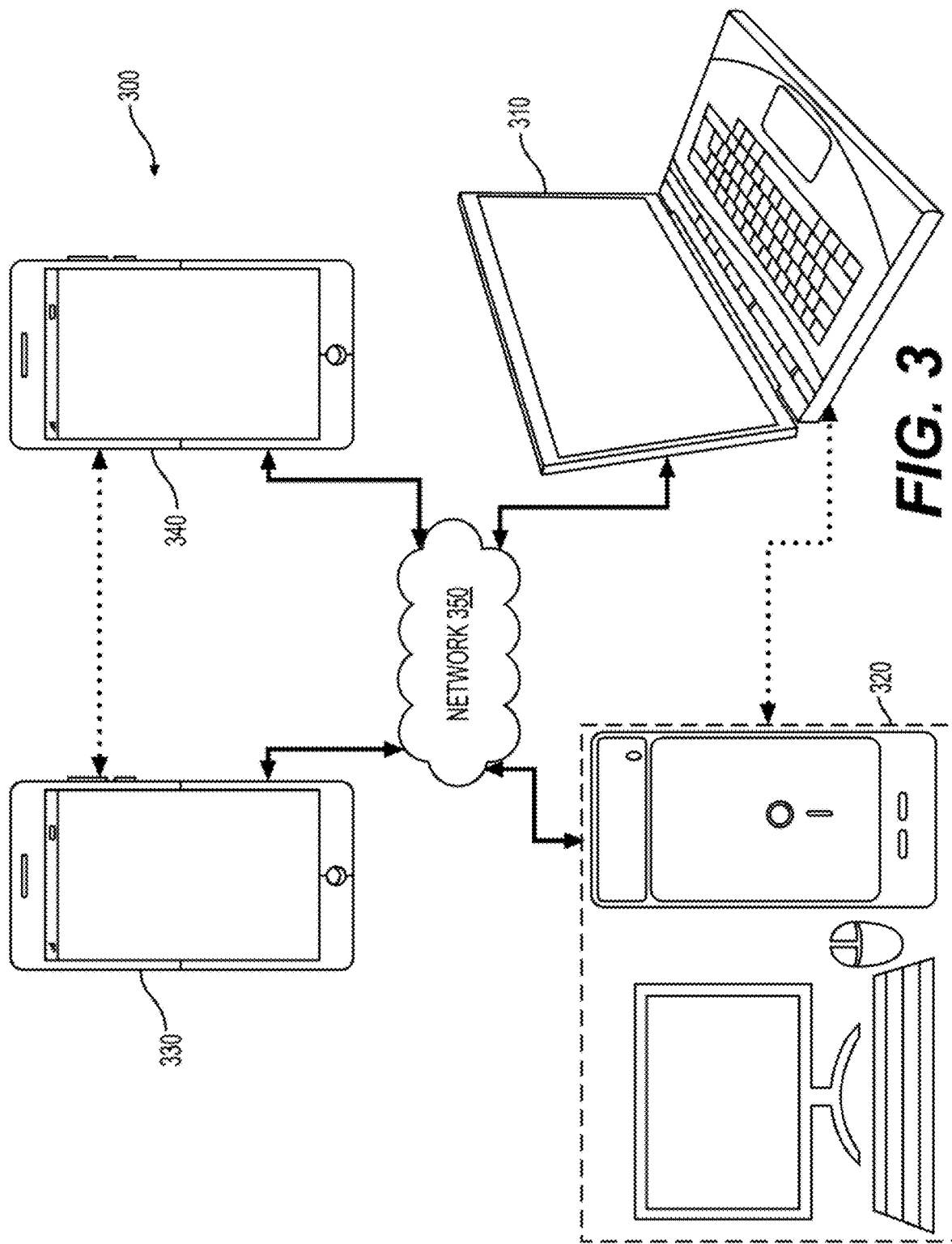
FIG. 3 is a schematic illustration of an exemplary block diagram of a communication system (300).

FIG. 3 illustrates an exemplary block diagram of a communication system (300). The communication system (300) includes a plurality of terminal devices that can communicate with each other, via, for example, a network (350). For example, the communication system (300) includes a first pair of terminal devices (310) and (320) interconnected via the network (350). In the FIG. 3 example, the first pair of terminal devices (310) and (320) performs unidirectional transmission of data. For example, the terminal device (310) may code video data (e.g., a stream of video pictures that are captured by the terminal device (310)) for transmission to the other terminal device (320) via the network (350). The encoded video data can be transmitted in the form of one or more coded video bitstreams. The terminal device (320) may receive the coded video data from the network (350), decode the coded video data to recover the video pictures and display video pictures according to the recovered video data. Unidirectional data transmission may be common in media serving applications and the like.

In another example, the communication system (300) includes a second pair of terminal devices (330) and (340) that perform bidirectional transmission of coded video data, for example, during videoconferencing. For bidirectional transmission of data, in an example, each terminal device of the terminal devices (330) and (340) may code video data (e.g., a stream of video pictures that are captured by the terminal device) for transmission to the other terminal device of the terminal devices (330) and (340) via the network (350). Each terminal device of the terminal devices (330) and (340) also may receive the coded video data transmitted by the other terminal device of the terminal devices (330) and (340), and may decode the coded video data to recover the video pictures and may display video pictures at an accessible display device according to the recovered video data.

In the example of FIG. 3, the terminal devices (310), (320), (330) and (340) are respectively illustrated as servers, personal computers and smart phones but the principles of the present disclosure may be not so limited. Embodiments of the present disclosure find application with laptop computers, tablet computers, media players, and/or dedicated video conferencing equipment. The network (350) represents any number of networks that convey coded video data among the terminal devices (310), (320), (330) and (340), including for example wireline (wired) and/or wireless communication networks. The communication network (350) may exchange data in circuit-switched and/or packet-switched channels. Representative networks include telecommunications networks, local area networks, wide area networks and/or the Internet. For the purposes of the present discussion, the architecture and topology of the network (350) may be immaterial to the operation of the present disclosure unless explained herein below.

Figure 4:
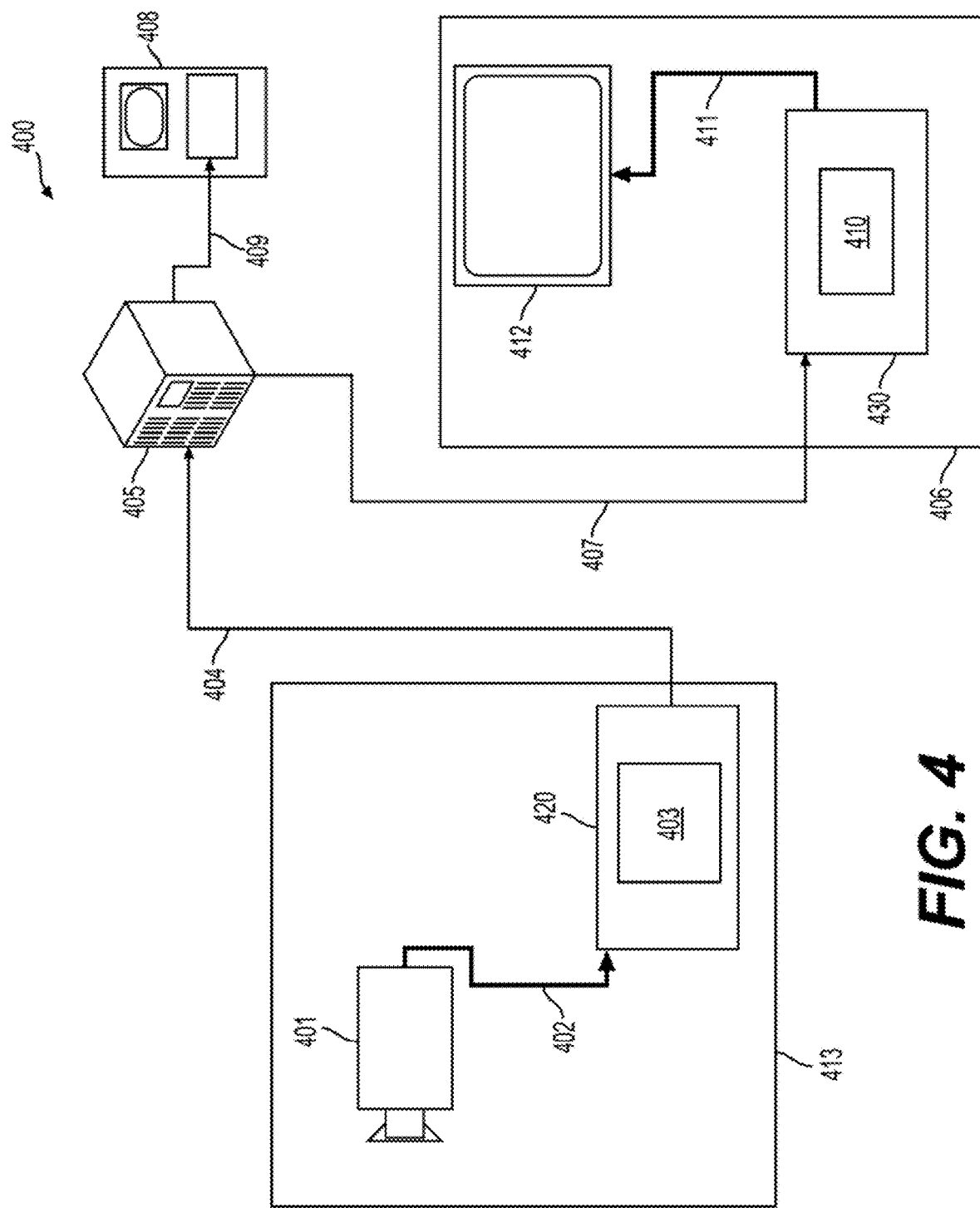
FIG. 4 is a schematic illustration of an exemplary block diagram of a communication system (400).

FIG. 4 illustrates, as an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

A streaming system may include a capture subsystem (413), that can include a video source (401), for example a digital camera, creating for example a stream of video pictures (402) that are uncompressed. In an example, the stream of video pictures (402) includes samples that are taken by the digital camera. The stream of video pictures (402), depicted as a bold line to emphasize a high data volume when compared to encoded video data (404) (or coded video bitstreams), can be processed by an electronic device (420) that includes a video encoder (403) coupled to the video source (401). The video encoder (403) can include hardware, software, or a combination thereof to enable or implement aspects of the disclosed subject matter as described in more detail below. The encoded video data (404) (or encoded video bitstream), depicted as a thin line to emphasize the lower data volume when compared to the stream of video pictures (402), can be stored on a streaming server (405) for future use. One or more streaming client subsystems, such as client subsystems (406) and (408) in FIG. 4 can access the streaming server (405) to retrieve copies (407) and (409) of the encoded video data (404). A client subsystem (406) can include a video decoder (410), for example, in an electronic device (430). The video decoder (410) decodes the incoming copy (407) of the encoded video data and creates an outgoing stream of video pictures (411) that can be rendered on a display (412) (e.g., display screen) or other rendering device (not depicted). In some streaming systems, the encoded video data (404), (407), and (409) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (420) and (430) can include other components (not shown). For example, the electronic device (420) can include a video decoder (not shown) and the electronic device (430) can include a video encoder (not shown) as well.

Figure 5:
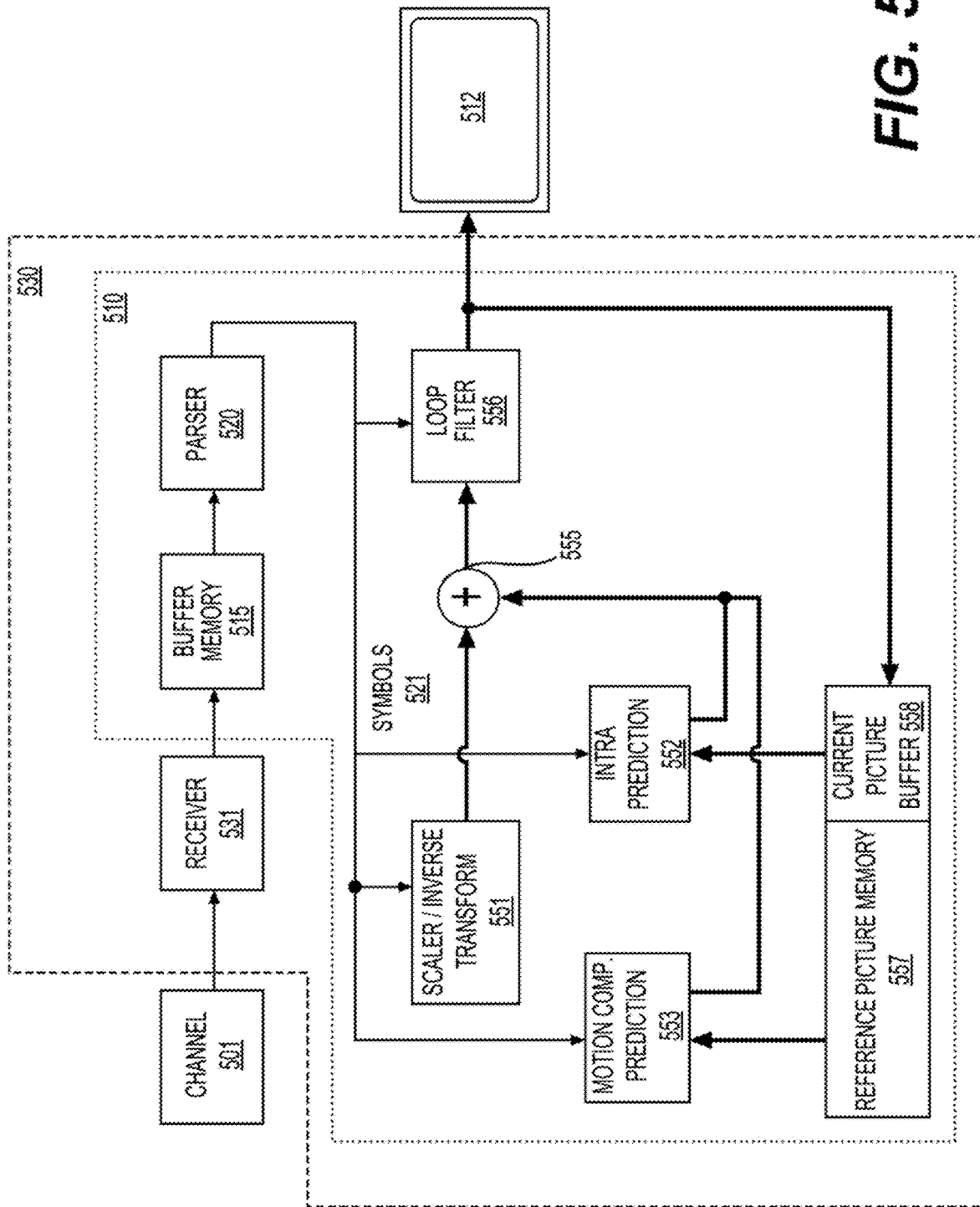
FIG. 5 is a schematic illustration of an exemplary block diagram of a decoder.

FIG. 5 shows an exemplary block diagram of a video decoder (510). The video decoder (510) can be included in an electronic device (530). The electronic device (530) can include a receiver (531) (e.g., receiving circuitry). The video decoder (510) can be used in the place of the video decoder (410) in the FIG. 4 example.

The receiver (531) may receive one or more coded video sequences to be decoded by the video decoder (510). In an embodiment, one coded video sequence is received at a time, where the decoding of each coded video sequence is independent from the decoding of other coded video sequences. The coded video sequence may be received from a channel (501), which may be a hardware/software link to a storage device which stores the encoded video data. The receiver (531) may receive the encoded video data with other data, for example, coded audio data and/or ancillary data streams, that may be forwarded to their respective using entities (not depicted). The receiver (531) may separate the coded video sequence from the other data. To combat network jitter, a buffer memory (515) may be coupled in between the receiver (531) and an entropy decoder/parser (520) ("parser (520)" henceforth). In certain applications, the buffer memory (515) is part of the video decoder (510). In others, it can be outside of the video decoder (510) (not depicted). In still others, there can be a buffer memory (not depicted) outside of the video decoder (510), for example to combat network jitter, and in addition another buffer memory (515) inside the video decoder (510), for example to handle playout timing. When the receiver (531) is receiving data from a store/forward device of sufficient bandwidth and controllability, or from an isosynchronous network, the buffer memory (515) may not be needed, or can be small. For use on best effort packet networks such as the Internet, the buffer memory (515) may be required, can be comparatively large and can be advantageously of adaptive size, and may at least partially be implemented in an operating system or similar elements (not depicted) outside of the video decoder (510).

The video decoder (510) may include the parser (520) to reconstruct symbols (521) from the coded video sequence. Categories of those symbols include information used to manage operation of the video decoder (510), and potentially information to control a rendering device such as a render device (512) (e.g., a display screen) that is not an integral part of the electronic device (530) but can be coupled to the electronic device (530), as shown in FIG. 5. The control information for the rendering device(s) may be in the form of Supplemental Enhancement Information (SEI) messages or Video Usability Information (VUI) parameter set fragments (not depicted). The parser (520) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients, quantizer parameter values, motion vectors, and so forth.

The parser (520) may perform an entropy decoding/parsing operation on the video sequence received from the buffer memory (515), so as to create symbols (521).

Reconstruction of the symbols (521) can involve multiple different units depending on the type of the coded video picture or parts thereof (such as: inter and intra picture, inter and intra block), and other factors. Which units are involved, and how, can be controlled by subgroup control information parsed from the coded video sequence by the parser (520). The flow of such subgroup control information between the parser (520) and the multiple units below is not depicted for clarity.

Beyond the functional blocks already mentioned, the video decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives a quantized transform coefficient as well as control information, including which transform to use, block size, quantization factor, quantization scaling matrices, etc. as symbol(s) (521) from the parser (520). The scaler/inverse transform unit (551) can output blocks comprising sample values, that can be input into aggregator (555).

In some cases, the output samples of the scaler/inverse transform unit (551) can pertain to an intra coded block. The intra coded block is a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current picture buffer (558). The current picture buffer (558) buffers, for example, partly reconstructed current picture and/or fully reconstructed current picture. The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated, block. In such a case, a motion compensation prediction unit (553) can access reference picture memory (557) to fetch samples used for prediction. After motion compensating the fetched samples in accordance with the symbols (521) pertaining to the block, these samples can be added by the aggregator (555) to the output of the scaler/inverse transform unit (551) (in this case called the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y, and reference picture components. Motion compensation also can include interpolation of sample values as fetched from the reference picture memory (557) when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520). Video compression can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to the render device (512) as well as stored in the reference picture memory (557) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (531) may receive additional (redundant) data with the encoded video. The additional data may be included as part of the coded video sequence(s). The additional data may be used by the video decoder (510) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 6:
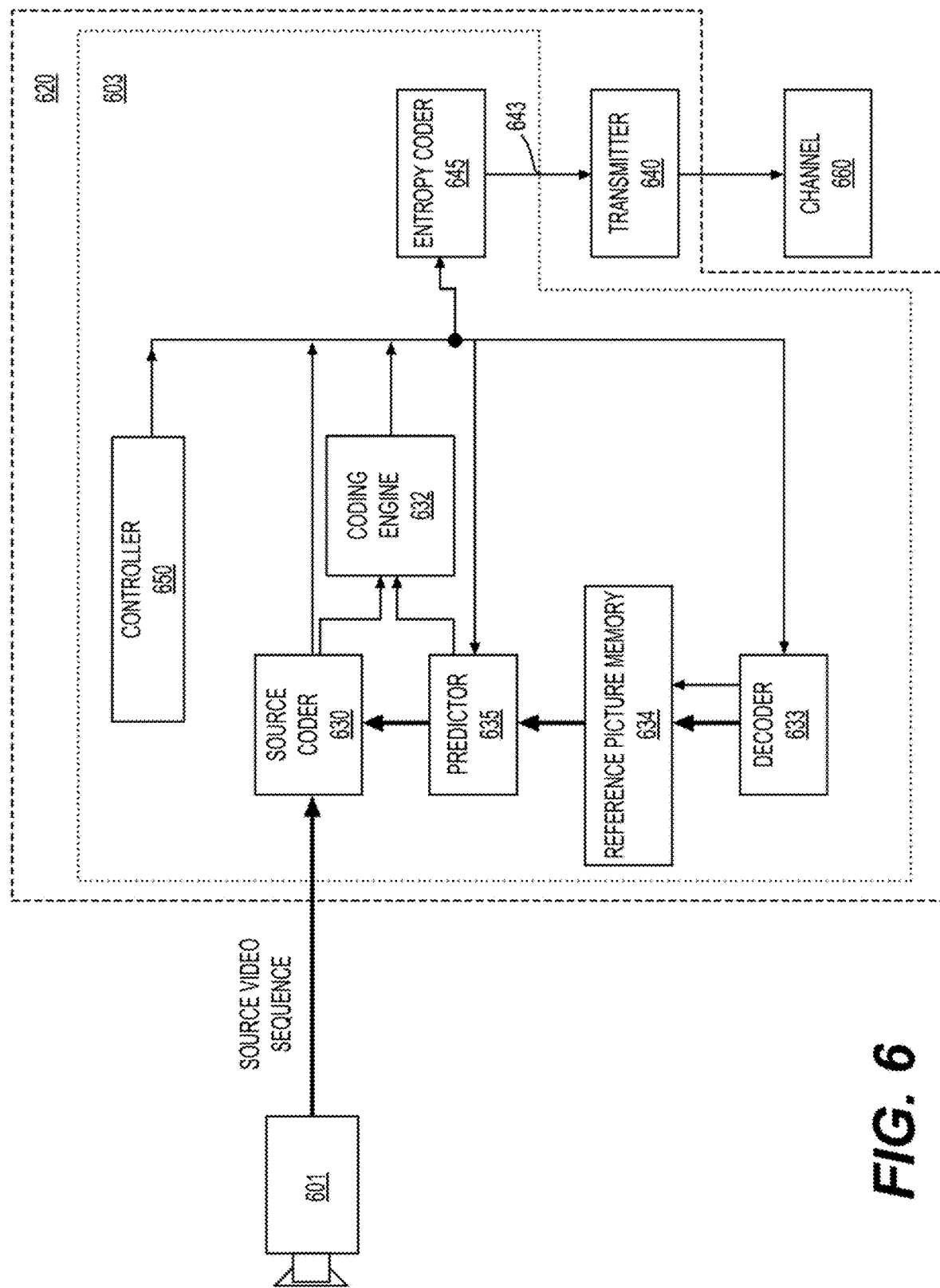
FIG. 6 is a schematic illustration of an exemplary block diagram of an encoder.

FIG. 6 shows an exemplary block diagram of a video encoder (603). The video encoder (603) is included in an electronic device (620). The electronic device (620) includes a transmitter (640) (e.g., transmitting circuitry). The video encoder (603) can be used in the place of the video encoder (403) in the FIG. 4 example.

The video encoder (603) may receive video samples from a video source (601) (that is not part of the electronic device (620) in the FIG. 6 example) that may capture video image(s) to be coded by the video encoder (603). In another example, the video source (601) is a part of the electronic device (620).

The video source (601) may provide the source video sequence to be coded by the video encoder (603) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (601) may be a storage device storing previously prepared video. In a videoconferencing system, the video source (601) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (603) may code and compress the pictures of the source video sequence into a coded video sequence (643) in real time or under any other time constraints as required. Enforcing appropriate coding speed is one function of a controller (650). In some embodiments, the controller (650) controls other functional units as described below and is functionally coupled to the other functional units. The coupling is not depicted for clarity. Parameters set by the controller (650) can include rate control related parameters (picture skip, quantizer, lambda value of rate-distortion optimization techniques, . . . ), picture size, group of pictures (GOP) layout, maximum motion vector search range, and so forth. The controller (650) can be configured to have other suitable functions that pertain to the video encoder (603) optimized for a certain system design.

In some embodiments, the video encoder (603) is configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder also would create. The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including the buffer memory (515), and parser (520) may not be fully implemented in the local decoder (633).

In an embodiment, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (630) may perform motion compensated predictive coding, which codes an input picture predictively with reference to one or more previously coded picture from the video sequence that were designated as "reference pictures." In this manner, the coding engine (632) codes differences between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture memory (634). In this manner, the video encoder (603) may store copies of reconstructed reference pictures locally that have common content as the reconstructed reference pictures that will be obtained by a far-end video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by applying lossless compression to the symbols according to technologies such as Huffman coding, variable length coding, arithmetic coding, and so forth.

The transmitter (640) may buffer the coded video sequence(s) as created by the entropy coder (645) to prepare for transmission via a communication channel (660), which may be a hardware/software link to a storage device which would store the encoded video data. The transmitter (640) may merge coded video data from the video encoder (603) with other data to be transmitted, for example, coded audio data and/or ancillary data streams (sources not shown).

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data, therefore, may conform to a syntax specified by the video coding technology or standard being used.

In an embodiment, the transmitter (640) may transmit additional data with the encoded video. The source coder (630) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 7:
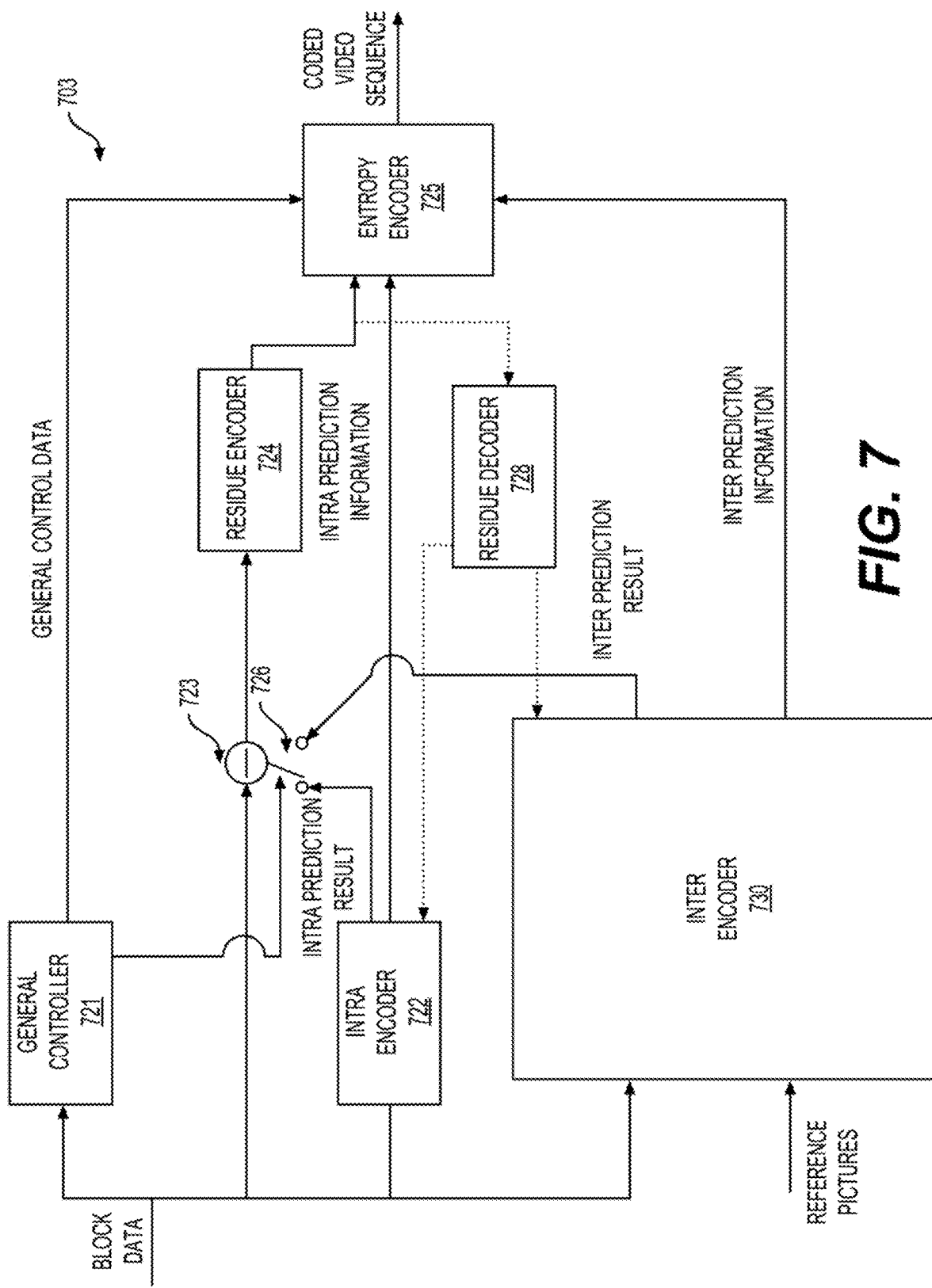
FIG. 7 shows a block diagram of an exemplary encoder.

FIG. 7 shows an exemplary diagram of a video encoder (703). The video encoder (703) is configured to receive a processing block (e.g., a prediction block) of sample values within a current video picture in a sequence of video pictures, and encode the processing block into a coded picture that is part of a coded video sequence. In an example, the video encoder (703) is used in the place of the video encoder (403) in the FIG. 4 example.

In an HEVC example, the video encoder (703) receives a matrix of sample values for a processing block, such as a prediction block of 8×8 samples, and the like. The video encoder (703) determines whether the processing block is best coded using intra mode, inter mode, or bi-prediction mode using, for example, rate-distortion optimization. When the processing block is to be coded in intra mode, the video encoder (703) may use an intra prediction technique to encode the processing block into the coded picture; and when the processing block is to be coded in inter mode or bi-prediction mode, the video encoder (703) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (703) includes other components, such as a mode decision module (not shown) to determine the mode of the processing blocks.

In the FIG. 7 example, the video encoder (703) includes an inter encoder (730), an intra encoder (722), a residue calculator (723), a switch (726), a residue encoder (724), a general controller (721), and an entropy encoder (725) coupled together as shown in FIG. 7.

The inter encoder (730) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (722) is configured to receive the samples of the current block (e.g., a processing block), in some cases compare the block to blocks already coded in the same picture, generate quantized coefficients after transform, and in some cases also generate intra prediction information (e.g., an intra prediction direction information according to one or more intra encoding techniques). In an example, the intra encoder (722) also calculates intra prediction results (e.g., predicted block) based on the intra prediction information and reference blocks in the same picture.

The general controller (721) is configured to determine general control data and control other components of the video encoder (703) based on the general control data. In an example, the general controller (721) determines the mode of the block, and provides a control signal to the switch (726) based on the mode. For example, when the mode is the intra mode, the general controller (721) controls the switch (726) to select the intra mode result for use by the residue calculator (723), and controls the entropy encoder (725) to select the intra prediction information and include the intra prediction information in the bitstream; and when the mode is the inter mode, the general controller (721) controls the switch (726) to select the inter prediction result for use by the residue calculator (723), and controls the entropy encoder (725) to select the inter prediction information and include the inter prediction information in the bitstream.

The residue calculator (723) is configured to calculate a difference (residue data) between the received block and prediction results selected from the intra encoder (722) or the inter encoder (730). The residue encoder (724) is configured to operate based on the residue data to encode the residue data to generate the transform coefficients. In an example, the residue encoder (724) is configured to convert the residue data from a spatial domain to a frequency domain, and generate the transform coefficients. The transform coefficients are then subject to quantization processing to obtain quantized transform coefficients. In various embodiments, the video encoder (703) also includes a residue decoder (728). The residue decoder (728) is configured to perform inverse-transform, and generate the decoded residue data. The decoded residue data can be suitably used by the intra encoder (722) and the inter encoder (730). For example, the inter encoder (730) can generate decoded blocks based on the decoded residue data and inter prediction information, and the intra encoder (722) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (725) is configured to format the bitstream to include the encoded block. The entropy encoder (725) is configured to include various information in the bitstream according to a suitable standard, such as the HEVC standard. In an example, the entropy encoder (725) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 8:
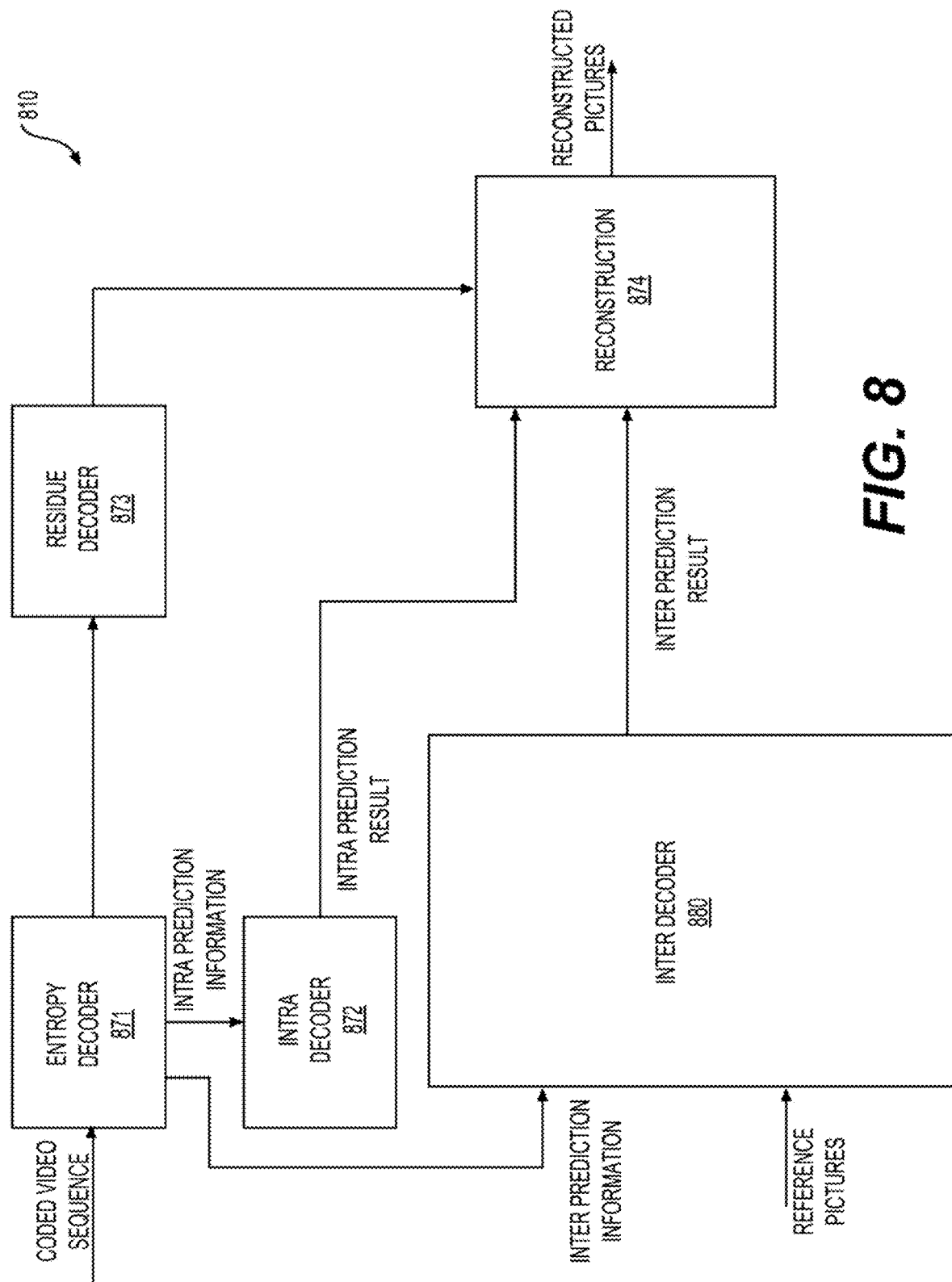
FIG. 8 shows a block diagram of an exemplary decoder.

FIG. 8 shows an exemplary diagram of a video decoder (810). The video decoder (810) is configured to receive coded pictures that are part of a coded video sequence, and decode the coded pictures to generate reconstructed pictures. In an example, the video decoder (810) is used in the place of the video decoder (410) in the FIG. 4 example.

In the FIG. 8 example, the video decoder (810) includes an entropy decoder (871), an inter decoder (880), a residue decoder (873), a reconstruction module (874), and an intra decoder (872) coupled together as shown in FIG. 8.

The entropy decoder (871) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode) and prediction information (such as, for example, intra prediction information or inter prediction information) that can identify certain sample or metadata that is used for prediction by the intra decoder (872) or the inter decoder (880), respectively. The symbols can also include residual information in the form of, for example, quantized transform coefficients, and the like. In an example, when the prediction mode is inter or bi-predicted mode, the inter prediction information is provided to the inter decoder (880); and when the prediction type is the intra prediction type, the intra prediction information is provided to the intra decoder (872). The residual information can be subject to inverse quantization and is provided to the residue decoder (873).

The inter decoder (880) is configured to receive the inter prediction information, and generate inter prediction results based on the inter prediction information.

The intra decoder (872) is configured to receive the intra prediction information, and generate prediction results based on the intra prediction information.

The residue decoder (873) is configured to perform inverse quantization to extract de-quantized transform coefficients, and process the de-quantized transform coefficients to convert the residual information from the frequency domain to the spatial domain. The residue decoder (873) may also require certain control information (to include the Quantizer Parameter (QP)), and that information may be provided by the entropy decoder (871) (data path not depicted as this may be low volume control information only).

The reconstruction module (874) is configured to combine, in the spatial domain, the residual information as output by the residue decoder (873) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (403), (603), and (703), and the video decoders (410), (510), and (810) can be implemented using any suitable technique. In an embodiment, the video encoders (403), (603), and (703), and the video decoders (410), (510), and (810) can be implemented using one or more integrated circuits. In another embodiment, the video encoders (403), (603), and (603), and the video decoders (410), (510), and (810) can be implemented using one or more processors that execute software instructions.

Various inter prediction modes can be used in VVC. For an inter-predicted CU, motion parameters can include MV(s), one or more reference picture indices, a reference picture list usage index, and additional information for certain coding features to be used for inter-predicted sample generation. A motion parameter can be signaled explicitly or implicitly. When a CU is coded with a skip mode, the CU can be associated with a PU and can have no significant residual coefficients, no coded motion vector delta or MV difference (e.g., MVD) or a reference picture index. A merge mode can be specified where the motion parameters for the current CU are obtained from neighboring CU(s), including spatial and/or temporal candidates. The merge mode can be applied to an inter-predicted CU, not only for skip mode. In an example, an alternative to the merge mode is the explicit transmission of motion parameters, where MV(s), a corresponding reference picture index for each reference picture list and a reference picture list usage flag and other information are signaled explicitly per CU.

Certain inter prediction coding tools (e.g., refined inter prediction coding tools), such as a bi-directional optical flow (BDOF) mode, a decoder-side motion vector refinement (DMVR) mode, and a merge with motion vector difference (MMVD) mode can be used in VVC.

According to an embodiment of the disclosure, the BDOF mode is a motion refinement technique used in inter prediction. The BDOF mode can be used to refine a bi-prediction signal of a CU, for example, at a 4×4 subblock level. The BDOF mode can be applied to a CU when certain conditions are satisfied. In an example, the conditions include: (i) the CU is coded using a "true" bi-prediction mode, e.g., one of two reference pictures is prior to a current picture in a display order and another of the two reference pictures is after the current picture in the display order, (ii) distances (e.g., picture order count (POC) differences) from the two reference pictures to the current picture are identical, (iii) the two reference pictures are short-term reference pictures, (iv) the CU is not coded using an affine mode or a subblock-based temporal motion vector prediction (SbTMVP) merge mode, (v) the CU has more than 64 luma samples, (vi) a CU height and a CU width are larger than or equal to 8 luma samples, (vii) a bi-prediction with CU weight (BCW) weight index indicates an equal weight, (viii) a weighted prediction (WP) is not enabled for the current CU, and (ix) a combined inter-intra prediction (CIIP) mode is not used for the current CU.

Figure 9:
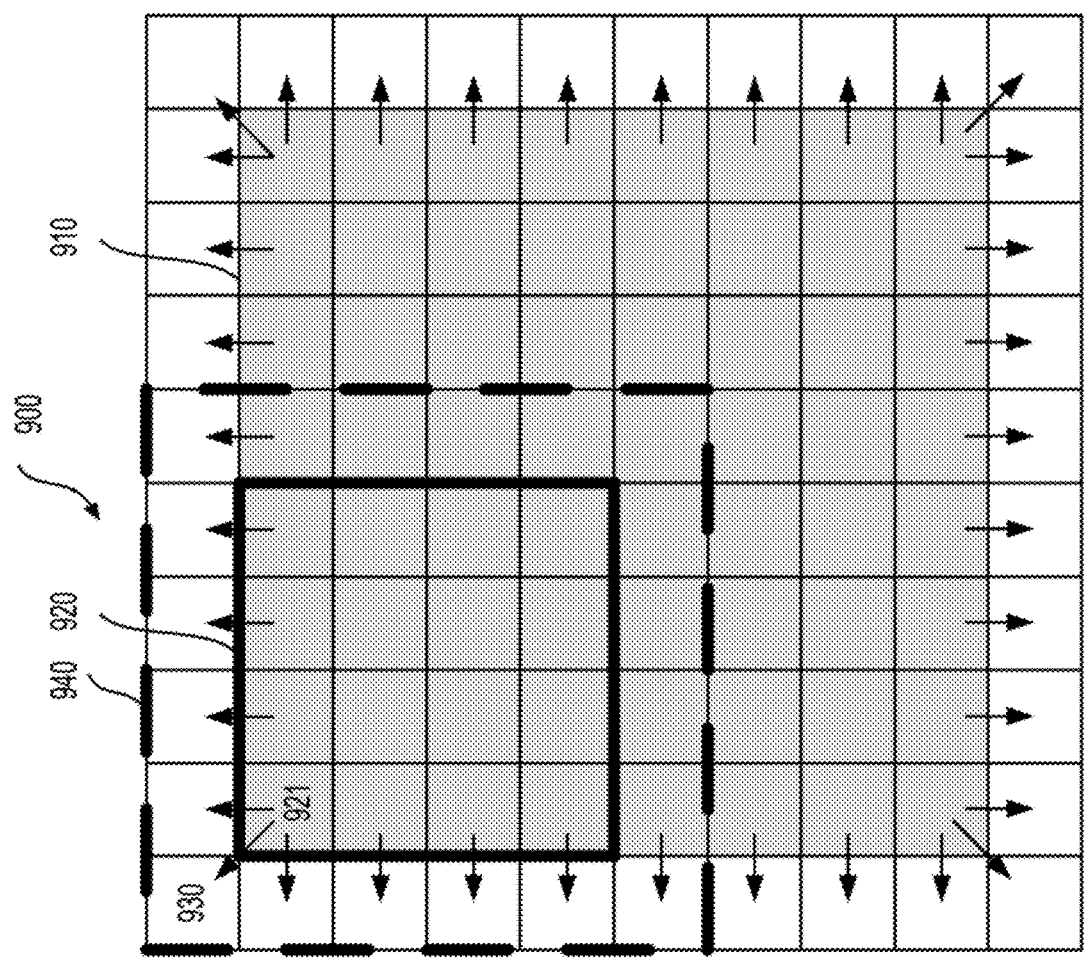
FIG. 9 shows an example of a bi-directional optical flow (BDOF) mode.

In an embodiment, the BDOF mode is only applied to a luma component. The motion refinement in the BDOF mode is based on the optical flow concept, which, for example, assumes that the motion of an object is smooth. Referring to FIG. 9, for each subblock, such as a 4×4 subblock (e.g., a subblock (920) in a CU (910)), a motion refinement (e.g., a MV refinement or MVR) ($\Delta mv_x, \Delta mv_y$) can be calculated by minimizing a difference between L0 and L1 prediction samples. In an example, the L0 prediction samples and the L1 prediction samples are prediction samples based on a first reference picture (L0) and a second reference picture (L1), respectively. The motion refinement can be used to adjust bi-predicted sample values in the 4×4 sub-block (e.g., the subblock (920)). The following steps can be applied in the BDOF process.

Horizontal and vertical gradients, $$\frac{\partial I^{(k)}}{\partial x}(i, j) \text{ and } \frac{\partial I^{(k)}}{\partial y}(i, j),$$

k=0, 1, of the two prediction signals can be computed by directly calculating the difference between two neighboring samples, e.g., $$\frac{\partial I^{(k)}}{\partial x}(i, j) = \left(\left(I^{(k)}(i+1, j) \gg shift1\right) - \left(I^{(k)}(i-1, j) \gg shift1\right)\right) \quad \text{Eq. 1}$$

$$\frac{\partial I^{(k)}}{\partial y}(i, j) = \left(\left(I^{(k)}(i, j+1) \gg shift1\right) - \left(I^{(k)}(i, j-1) \gg shift1\right)\right)$$

where $I^{(k)}(i,j)$ is the sample value at coordinate (i,j) of the prediction signal in a list k, k=0, 1, and the parameter shift1 is calculated based on a luma bit depth, bitDepth (BD). In an example, shift1=max(6, bitDepth-6).

In an example, auto-correlations and cross-correlations of gradients, $S_1$, $S_2$, $S_3$, $S_5$ and $S_6$, are calculated as below.

$$S_1 = \sum_{(i,j) \in \Omega} \text{Abs}(\psi_x(i, j)), S_3 = \sum_{(i,j) \in \Omega} \theta(i, j) \cdot \text{Sign}(\psi_x(i, j)) \quad \text{Eq. 2}$$

$$S_2 = \sum_{(i,j) \in \Omega} \psi_x(i, j) \cdot \text{Sign}(\psi_y(i, j))$$

$$S_5 = \sum_{(i,j) \in \Omega} \text{Abs}(\psi_y(i, j)), S_6 = \sum_{(i,j) \in \Omega} \theta(i, j) \cdot \text{Sign}(\psi_y(i, j))$$

where $$\psi_x(i, j) = \left(\frac{\partial I^{(1)}}{\partial x}(i, j) + \frac{\partial I^{(0)}}{\partial x}(i, j)\right) \gg n_a \quad \text{Eq. 3}$$

$$\psi_y(i, j) = \left(\frac{\partial I^{(1)}}{\partial y}(i, j) + \frac{\partial I^{(0)}}{\partial y}(i, j)\right) \gg n_a$$

$$\theta(i, j) = \left(I^{(1)}(i, j) \gg n_b\right) - \left(I^{(0)}(i, j) \gg n_b\right)$$

and $\Omega$ is a window, such as a 6×6 window (e.g., (940)), around the subblock (e.g., the subblock (920)), and the values $n_a$ and $n_b$ are set equal to min(1, bitDepth-11) and min(4, bitDepth-8), respectively.

The MVR ($\Delta mv_x, \Delta mv_y$) can be derived using the auto-correlations and cross-correlations as follows.

$$\Delta mv_x = S_1 > 0?\text{clip3}(-th'_{BIO}, th'_{BIO}, -(S_3 \cdot 2^{n_b - n_a}) >> \lfloor \log_2 S_1 \rfloor):0 \qquad \text{Eq. 4}$$

$$(\Delta mv_y = S_5 > 0?\text{clip3}(-th'_{BIO}, th'_{BIO}, -((S_6 \cdot 2^{n_b - n_a} - ((v_x S_{2,m}) << n_{S_2} + v_x S_{2,s})/2) >> \lfloor \log_2 S_5 \rfloor):0 \qquad \text{Eq. 5}$$

where $S_{2,m} = S_2 >> n_{S_2}$, $S_{2,s} = S_2 \& (2^{n_{s2}} - 1)$, $\lfloor \cdot \rfloor$ is the floor function, and $n_{S_2} = 12$. In an example, $th'_{BIO} = 2^{max (5, BD-7)}$.

Based on the motion refinement and the gradients, the following adjustment (or prediction refinement) b(x, y) can be calculated for each sample in the subblock (e.g., the 4×4 subblock):

$$b(x, y) = rnd\left(\frac{\left(\Delta mv_x\left(\frac{\partial I^{(1)}(x, y)}{\partial x} - \frac{\partial I^{(0)}(x, y)}{\partial x}\right) + \Delta mv_y\left(\frac{\partial I^{(1)}(x, y)}{\partial y} - \frac{\partial I^{(0)}(x, y)}{\partial y}\right) + 1\right)}{2}\right) \qquad \text{Eq. 6}$$

where the function 'rnd' represents a rounding operation.

The BDOF samples of the CU can be calculated by adjusting the bi-prediction samples as follows:

$$\text{pred}_{BDOF}(x,y) = (I^{(0)}(x,y) + I^{(1)}(x,y) + b(x,y) + o_{offset}) >> \text{shift} \qquad \text{Eq. 7}$$

In an embodiment, the values are selected such that multipliers in the BDOF process do not exceed 15-bit, and the maximum bit-width of the intermediate parameters in the BDOF process is kept within 32-bit.

In an example, to derive the gradient values, prediction samples $I^{(k)}(i,j)$ in the list k (k=0, 1) that are outside the current CU boundaries are to be generated. Referring to FIG. 9, the BDOF (e.g., in VVC) can use an extended row and/or an extended column around boundaries of a CU (910). In order to control a computational complexity of generating out-of-boundary prediction samples (e.g., a prediction for a sample (930)), prediction samples (e.g., (930)) in the extended area (white positions in FIG. 9) can be generated by taking reference samples at nearby integer positions (e.g., using a floor( ) operation on the coordinates) directly without interpolation. In an example, an 8-tap motion compensation interpolation filter (or an 8-tap interpolation filter) is used to generate prediction samples within the CU (910) (gray positions in FIG. 9). In an example shown in FIG. 9, the CU (910) includes 8×8 samples. In an example, the extended sample values are used in gradient calculations only. In an example, the gradient calculations are performed using Eq. 1, as described above.

Referring to FIG. 9, for the remaining steps in the BDOF process, if sample(s) and gradient value(s) outside the CU boundaries are required to be used, the sample(s) and the gradient value(s) outside the CU boundaries can be generated by padding (e.g., repeating) from corresponding nearest neighbors as indicated by arrows in FIG. 9. For example, the prediction sample and the gradient values at (930) can be padded from the corresponding sample and the gradient values at (921).

When a width and/or a height of a CU is larger than a threshold, such as 16 luma samples, the CU can be split into subblocks with widths and/or heights equal to 16 luma samples. Boundaries of the subblocks can be treated as boundaries of the CU in the BDOF process. A maximum unit size for the BDOF process can be limited to an area, such as 16×16 luma samples. For each subblock, the BDOF process can be skipped. In an example, when a sum of absolute differences (SAD) between the initial L0 and L1 prediction samples is smaller than a threshold, the BDOF process is not applied to the subblock. The threshold can be set to be 8×W×(H>>1), where W indicates the subblock width, and H indicates the subblock height. To avoid the additional complexity of a SAD calculation, the SAD between the initial L0 and L1 prediction samples calculated in a DMVR mode or a DMVR process can be reused.

If a BCW mode is enabled for the current block, when, for example, a BCW weight index indicates an unequal weight, the BDOF mode can be disabled. If a WP mode is enabled for the current block, when for example, a flag (e.g., luma_weight_1x_flag) is 1 for either of the two reference pictures, the BDOF mode can be disabled. When a CU is coded with a symmetric MVD mode or a CIIP mode, the BDOF can be disabled.

According to an aspect of the disclosure, a DMVR mode, for example, used in VVC, can be used to improve and/or refine accuracy of MVs in a merge mode.

Figure 10:
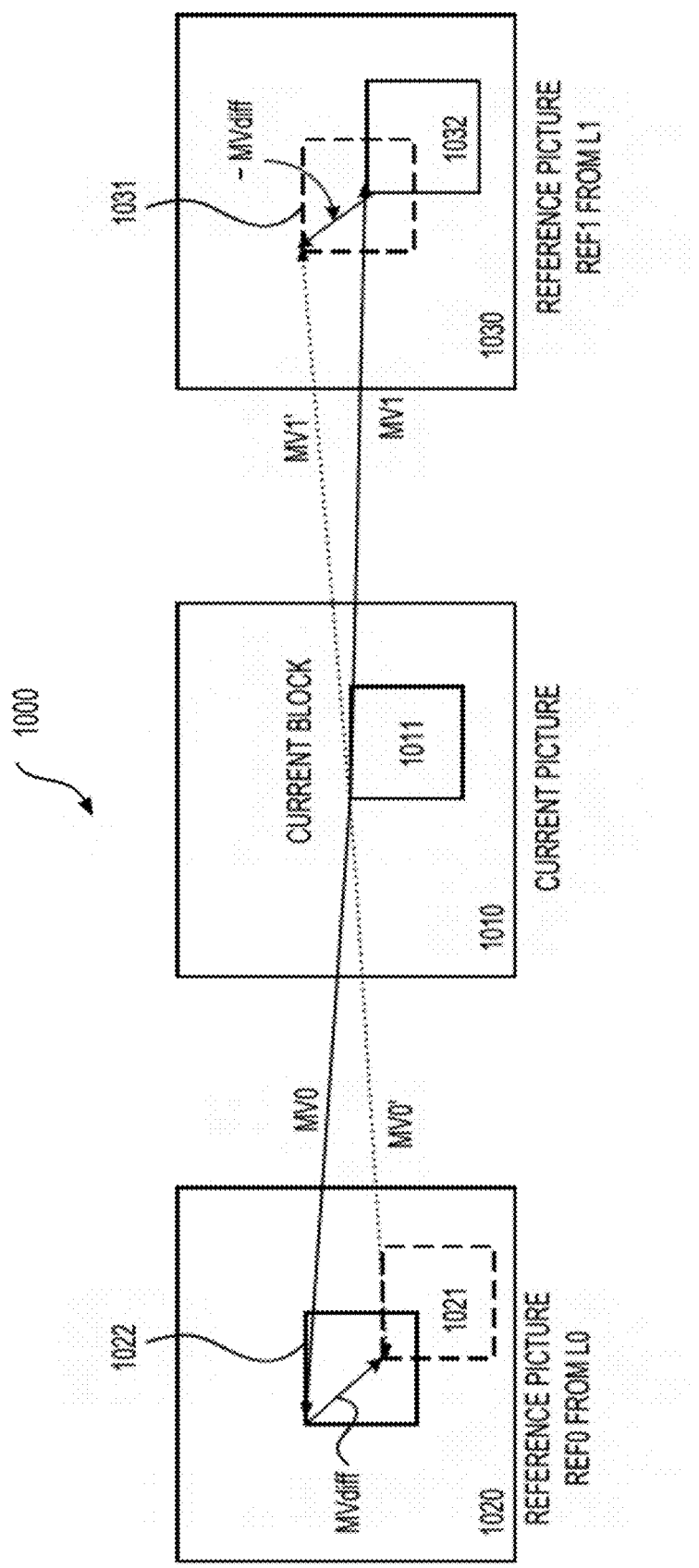
FIG. 10 shows an example of a decoder-side motion vector refinement (DMVR) mode.

FIG. 10 shows an example of a DMVR mode that is based on bilateral-matching (BM) or bilateral template matching according to an embodiment of the disclosure. A current block (1011) is in a current picture (1010). Initial MVs (e.g., MV0 and MV1) refer to a reference block (1022) in a reference picture (Rem) (1020) that is in a reference picture list L0 and a reference block (1032) in a reference picture (Ref1) (1030) that is in a reference picture list L1, respectively.

In some examples, such as in VVC, a BM based DMVR can be applied to increase accuracy of the motion vectors of the merge mode. In bi-prediction operation, refined MVs can be searched around the initial MVs (e.g., MV0 and MV1) in the reference picture list L0 and the reference picture list L1, respectively. Refined reference blocks (or candidate blocks) (1021) and (1031) can be determined. The bilateral matching method can calculate the distortion based on the two candidate blocks (1021) and (1031) in the reference picture list L0 and list L1.

In an example, a SAD between the candidate blocks (1021) and (1031) referenced by respective MV candidates (e.g., MV0' and MV1') that are around the initial MVs (e.g., MV0 and MV1) is calculated. The MV candidates (e.g., MV0' and MV1') with a lowest SAD can be the refined MVs and can be used to generate the bi-predicted signal.

A relationship between the initial MVs and the MV candidates can be described as below.

$$MV0' = MV0 + MV_{diff} \qquad \text{Eq. 8}$$

$$MV1' = MV1 - MV_{diff} \qquad \text{Eq. 9}$$

where $MV_{diff}$ indicates a MV difference (MVD) between a candidate MV (e.g., MV0') and an initial MV (e.g., MV0) in one (e.g., L0) of the reference pictures.

In some examples, such as in some applications in VVC, the application of DMVR is restricted. For example, the DMVR mode is applied for CUs which are coded with certain modes and features. In an example, the modes and features include (i) the CU is coded in a CU level merge mode with bi-prediction MV; (ii) one reference picture (e.g., a backward reference picture) is in the past and another reference picture (e.g., a forward reference picture) is in the future with respect to the current picture; (iii) distances (e.g., POC differences) from the two reference pictures to the current picture are identical, (iv) the two reference pictures are short-term reference pictures, (v) the CU has more than 64 luma samples, (vi) a CU height and a CU width are larger than or equal to 8 luma samples, (vii) a BCW weight index indicates an equal weight, (viii) a WP mode is not enabled for the current CU, and (ix) a CIIP mode is not used for the current CU.

The refined MV(s) derived by a DMVR process can be used to generate the inter prediction samples and used in a temporal motion vector prediction for future picture coding. The original MV(s) (e.g., the initial MV(s)) can be used in a deblocking process and used in a spatial motion vector prediction for future CU coding.

In an embodiment, a MMVD mode is used, such as in VVC, where implicitly derived motion information can be used to predict samples of a CU (e.g., a current CU). A MMVD merge flag can be signaled to specify whether the MMVD mode is used for the CU, for example, after signaling a skip flag or a merge flag.

In the MMVD mode, after a merge candidate (also referred to as an MV basis or an MV starting point) is selected, the merge candidate can be refined by additional information, such as signaled MVD information. The additional information can include an index (such as a distance index, e.g., mmvd_distance_idx[x0][y0]) used to specify a motion magnitude and an index (such as a direction index, e.g., mmvd_direction_idx[x0][y0]) used to indicate a motion direction. In the MMVD mode, one of the first two candidates in the merge list can be selected as an MV basis. For example, a merge candidate flag (e.g., mmvd_cand_flag[x0][y0]) indicates the one of the first two candidates in the merge list. The merge candidate flag can be signaled to indicate (e.g., specify) which one of the first two candidates is selected. The additional information can indicate a MVD (or a motion offset) to the MV basis. For example, the motion magnitude indicates a magnitude of the MVD, the motion direction indicates a direction of the MVD.

Figure 11:
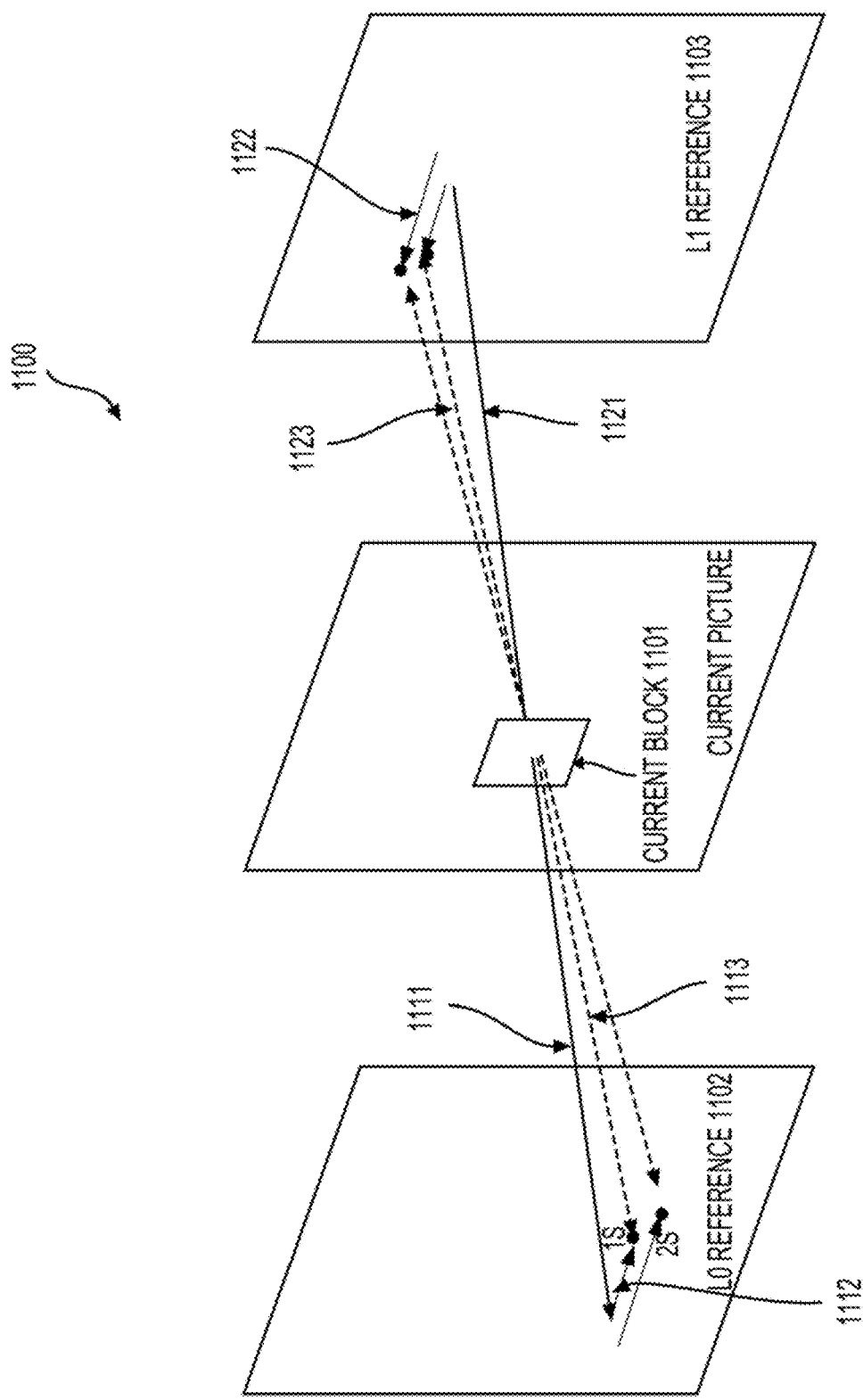
FIG. 11 shows an example of a search process in a merge mode with motion vector difference (MMVD) mode.

In an example, the merge candidate selected from the merge candidate list is used to provide the starting point or the MV starting point at a reference picture. A motion vector of the current block can be expressed with the starting point and a motion offset (or MVD) including a motion magnitude and a motion direction with respect to the starting point. At an encoder side, selection of the merge candidate and determination of the motion offset can be based on a search process (an evaluation process), such as shown in FIG. 11. At a decoder side, the selected merge candidate and the motion offset can be determined based on signaling from the encoder side.

Figure 12:
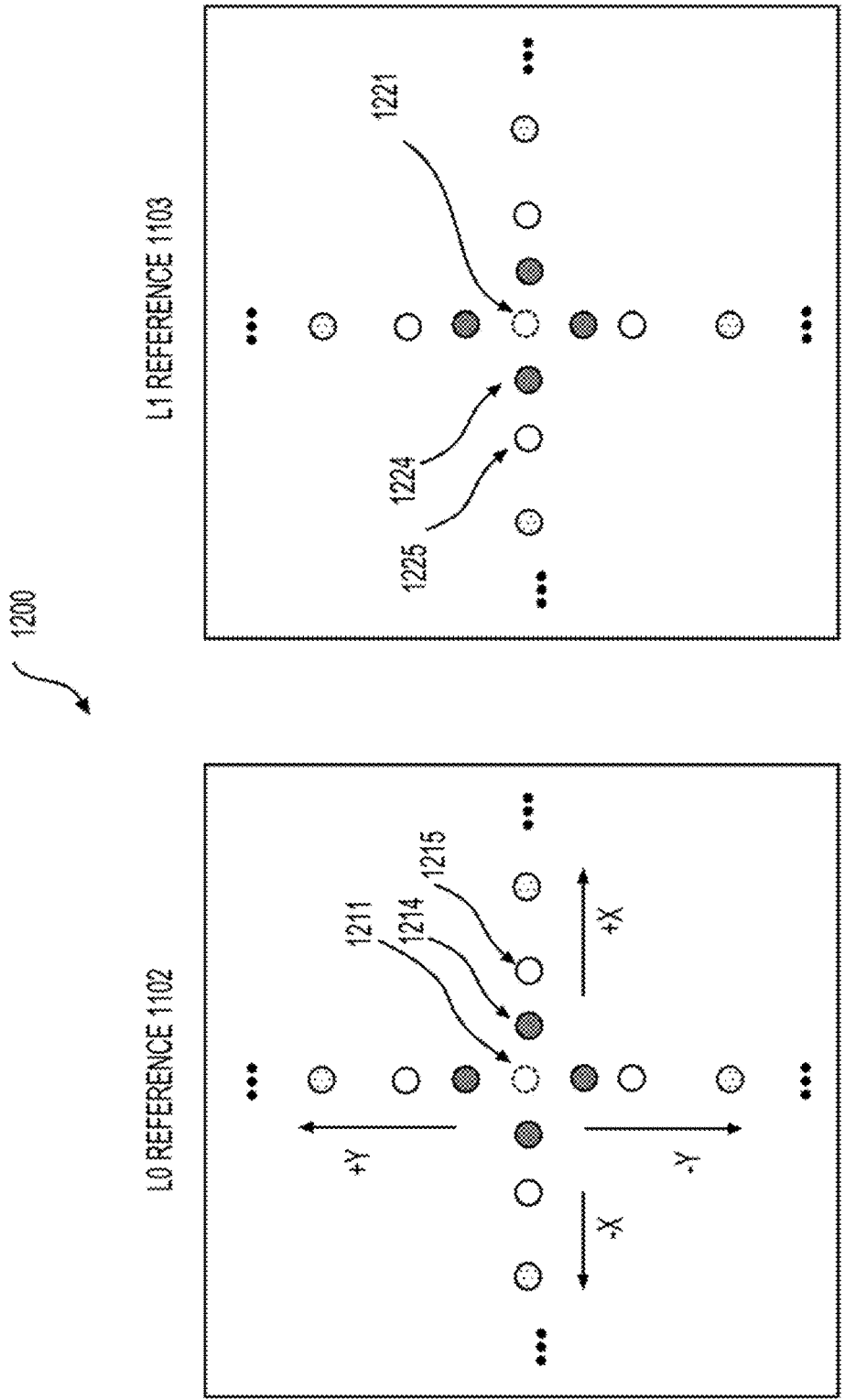
FIG. 12 shows examples of search points in an MMVD mode.

FIG. 11 shows an example of a search process (1100) in a MMVD mode. FIG. 12 shows examples of search points in a MMVD mode. In some examples, a subset or an entire set of the search points in FIG. 12 are used in the search process (1100) in FIG. 11. By performing the search process (1100), for example, at the encoder side, the additional information including the merge candidate flag (e.g., mmvd_cand_flag[x0][y0]), the distance index (e.g., mmvd_distance_idx[x0][y0]), and the direction index (e.g., mmvd_direction_idx[x0][y0]) can be determined for a current block (1101) in a current picture (or a current frame).

A first motion vector (1111) and a second motion vector (1121) belonging to a first merge candidate are shown. The first motion vector (1111) and the second motion vector (1121) are MV starting points used in the search process (1100). The first merge candidate can be a merge candidate on a merge candidate list constructed for the current block (1101). The first and second motion vectors (1111) and (1121) can be associated with two reference pictures (1102) and (1103) in reference picture lists L0 and L1, respectively. Referring to FIGS. 11-12, the first and second motion vectors (1111) and (1121) can point to two starting points (1211) and (1221) in the reference pictures (1102) and (1103), respectively, as shown in FIG. 12.

Referring to FIG. 12, the two starting points (1211) and (1221) in FIG. 12 can be determined at the reference pictures (1102) and (1103). In an example, based on the starting points (1211) and (1221), multiple predefined points extending from the starting points (1211) and (1221) in vertical directions (represented by +Y, or -Y) or horizontal directions (represented by +X and -X) in the reference pictures (1102) and (1103) can be evaluated. In one example, a pair of points mirroring each other with respect to the respective starting point (1211) or (1221), such as the pair of points (1214) and (1224) (e.g., indicated by a shift of 1S in FIG. 11), or the pair of points (1215) and (1225) (e.g., indicated by a shift of 2S in FIG. 11), can be used to determine a pair of motion vectors (e.g., MVs (1113) and (1123) in FIG. 11) which may form a motion vector predictor candidate for the current block (1101). The motion vector predictor candidates (e.g., MVs (1113) and (1123) in FIG. 11) determined based on the predefined points surrounding the starting points (1211) or (1221) can be evaluated.

The distance index (e.g., mmvd_distance_idx[x0][y0]) can specify motion magnitude information and indicate a pre-defined offset (e.g., 1S or 2S in FIG. 11) from the starting point that is indicated by the merge candidate flag.

Referring to FIG. 11, an offset (e.g., a MVD (1112) or a MVD (1122)) can be applied (e.g., added) to a horizontal component or a vertical component of the starting MV (e.g., the MV (1111) or (1121)). An exemplary relationship of the distance index (IDX) and the pre-defined offset is specified in Table 1. When a full-pel MMVD is off, for example, a full-pel MMVD flag (e.g., slice_fpel_mmvd_enabled_flag) is equal to 0, a range of MMVD pre-defined offsets can be from ¼ luma samples to 32 luma samples. When the full-pel MMVD is off, the pre-defined offset can have a non-integer value, such as a fraction of a luma sample (e.g., ¼ pixel or ½ pixel). When the full-pel MMVD is on, for example, the full-pel MMVD flag (e.g., slice_fpel_mmvd_enabled_flag) is equal to 1, the range of MMVD pre-defined offsets can be from 1 luma sample to 128 luma samples. In an example, when the full-pel MMVD is on, the pre-defined offset only has an integer value, such as one or more luma samples.

TABLE 1

An exemplary relationship of a distance index and an offset (e.g., a pre-defined offset)

| Distance IDX | 0 | 1 | 2 | 3 | 4 | 5 | 6 | 7 |
|---|---|---|---|---|---|---|---|---|
| Offset (in unit of luma sample) Full-pel MMVD off | 1/4 | 1/2 | 1 | 2 | 4 | 8 | 16 | 32 |
| Offset (in unit of luma sample) Full-pel MMVD on | 1 | 2 | 4 | 8 | 16 | 32 | 64 | 128 |

The direction index can represent a direction (or a motion direction) of the MVD relative to the starting point. In an example, the direction index represents one of the four directions shown in Table 2. The meaning of MVD sign(s) in Table 2 can vary according to information of starting MV(s). In an example, when the starting MV is a uni-prediction MV or the starting MVs are bi-prediction MVs with both reference lists point to a same side of the current picture (e.g., POCs of two reference pictures are both larger than a POC of the current picture or the POCs of the two reference pictures are both smaller than the POC of the current picture), the MVD sign(s) in Table 2 specifies the sign of the MV offset (or the MVD) that is added to the starting MV.

When the starting MVs are the bi-prediction MVs with the two MVs pointing to different sides of the current picture (e.g., the POC of one reference picture is larger than the POC of the current picture, and the POC of the other reference picture is smaller than the POC of the current picture), the MVD sign in Table 2 specifies the sign of the MV offset (or the MVD) added to the list0 MV component of the starting MV and the MVD sign for the list1 MV has an opposite value. Referring to FIG. 11, the starting MVs (1111) and (1121) are the bi-prediction MVs with the two MVs (1111) and (1121) point to different sides of the current picture. The POC of the L1 reference picture (1103) is larger than the POC of the current picture, and the POC of the L0 reference picture (1102) is smaller than the POC of the current picture. The MVD sign (e.g., the sign "+" for the x-axis) indicated by the direction index (e.g., 00) in Table 2 specifies the sign (e.g., the sign "+" for the x-axis) of the MVD (e.g., the MVD (1112)) added to the list0 MV component of the starting MV (e.g., (1111)) and the MVD sign of the MVD (1122) for the list1 MV component of the starting MV (e.g., (1121)) has an opposite value, such as a sign "−" that is opposite to the sign "+" of the MVD (1112).

Referring to Table 2, the direction index 00 indicates a positive direction in the x-axis, the direction index 01 indicates a negative direction in the x-axis, the direction index 10 indicates a positive direction in the y-axis, and the direction index 11 indicates a negative direction in the y-axis.

TABLE 2

An exemplary relationship between a sign of an MV offset and a direction index

| Direction IDX | 00 | 01 | 10 | 11 |
|---|---|---|---|---|
| x-axis | + | − | N/A | N/A |
| y-axis | N/A | N/A | + | − |

A syntax element mmvd_merge_flag[x0][y0] can be used to represent the MMVD merge flag of the current CU. In an example, the MMVD merge flag (e.g., mmvd_merge_flag [x0][y0]) equal to 1 specifies that the MMVD mode is used to generate the inter prediction parameters of the current CU. The MMVD merge flag (e.g., mmvd_merge_flag[x0][y0]) equal to 0 specifies that the MMVD mode is not used to generate the inter prediction parameters. The array indices x0 and y0 can specify a location (x0, y0) of a top-left luma sample of the considered coding block (e.g., the current CB) relative to a top-left luma sample of the picture (e.g., the current picture).

When the MMVD merge flag (e.g., mmvd_merge_flag [x0][y0]) is not present for the current CU, the MMVD merge flag (e.g., mmvd_merge_flag[x0][y0]) can be inferred to be equal to 0 for the current CU.

In some examples, such as in VVC specification, a single context is used to signal the MMVD merge flag (e.g., mmvd_merge_flag). For example, the single context is used to code (e.g., encode and/or decode) the MMVD merge flag in a context-adaptive binary arithmetic coding (CABAC).

A syntax element mmvd_cand_flag[x0][y0] can represent the merge candidate flag. In an example, the merge candidate flag (e.g., mmvd_cand_flag[x0][y0]) specifies whether the first (0) or the second (1) candidate in the merging candidate list is used with the MVD derived from the distance index (e.g., mmvd_distance_idx[x0][y0]) and the direction index (e.g., mmvd_direction_idx[x0][y0]). The array indices x0 and y0 can specify the location (x0, y0) of the top-left luma sample of the considered coding block (e.g., the current CB) relative to the top-left luma sample of the picture (e.g., the current picture).

When the merge candidate flag (e.g., mmvd_cand_flag [x0][y0]) is not present, the merge candidate flag (e.g., mmvd_cand_flag[x0][y0]) can be inferred to be equal to 0.

A syntax element mmvd_distance_idx[x0][y0] can represent the distance index. In an example, the distance index (e.g., mmvd_distance_idx[x0][y0]) specifies the index used to derive MmvdDistance[x0][y0], such as specified in Table 3. The array indices x0 and y0 can specify the location (x0, y0) of the top-left luma sample of the considered coding block (e.g., the current CB) relative to the top-left luma sample of the picture (e.g., the current picture).

TABLE 3

An exemplary relationship between a MmvdDistance[ x0 ][ y0 ] and a mmvd_distance_idx[ x0 ][ y0 ]

| | MmvdDistance[ x0 ][ y0 ] | |
|---|---|---|
| mmvd_distance_ idx[ x0 ][ y0 ] | slice_fpel_mmvd_ enabled_flag == 0 | slice_fpel_mmvd_ enabled_flag == 1 |
| 0 | 1 | 4 |
| 1 | 2 | 8 |
| 2 | 4 | 16 |
| 3 | 8 | 32 |
| 4 | 16 | 64 |
| 5 | 32 | 128 |
| 6 | 64 | 256 |
| 7 | 128 | 512 |

The first column in Table 3 indicates the distance index (e.g., mmvd_distance_idx[x0][y0]). The second column in Table 3 indicates the motion magnitude (e.g., the MmvdDistance[x0][y0]) when the full-pel MMVD is off, for example, the full-pel MMVD flag (e.g., slice_fpel_mmvd_enabled_flag) is equal to 0. The third column in Table 3 indicates the motion magnitude (e.g., the MmvdDistance [x0][y0]) when the full-pel MMVD is on, for example, the full-pel MMVD flag (e.g., slice_fpel_mmvd_enabled_flag) is equal to 1.

In an example, the units of the second column and the third column in Table 3 are ¼ luma samples. Referring to the first row of Table 3, when the distance index (e.g., mmvd_distance_idx[x0][y0]) is 0, the motion magnitude (e.g., the MmvdDistance[x0][y0]) is 1 when the full-pel MMVD is off (e.g., slice_fpel_mmvd_enabled_flag being 0). The motion magnitude (e.g., the MmvdDistance[x0][y0]) is 1×¼ luma samples or ¼ luma samples. When the distance index (e.g., mmvd_distance_idx[x0][y0]) is 0, the motion magnitude (e.g., the MmvdDistance[x0][y0]) is 4 when the full-pel MMVD is on (e.g., slice_fpel_mmvd_enabled_flag being 1). The motion magnitude (e.g., the MmvdDistance[x0][y0]) is 4×¼ luma samples or 1 luma sample.

In an example, the second column (in units of ¼ luma samples) in Table 3 corresponds to the second row (in units of a luma sample) in Table 1, and the third column (in units of ¼ luma samples) in Table 3 corresponds to the third row (in units of a luma sample) in Table 1.

A syntax element mmvd_direction_idx[x0][y0] can represent the direction index. In an example, the direction index (e.g., mmvd_direction_idx[x0][y0]) specifies the index used to derive the motion direction (e.g., MmvdSign[x0][y0]) as specified in Table 4. The array indices x0 and y0 specify the location (x0, y0) of the top-left luma sample of the considered coding block (e.g., the current CB) relative to the top-left luma sample of the picture (e.g., the current picture). The first column in Table 4 indicates the direction index (e.g., mmvd_distance_idx[x0][y0]). The second column in Table 4 indicates a first sign (e.g., MmvdSign[x0][y0][0]) of a first component (e.g., $MVD_x$ or MmvdOffset[x0][y0][0]) of the MVD. The third column in Table 4 indicates a second sign (e.g., MmvdSign[x0][y0][1]) of a second component (e.g., $MVD_y$ or MmvdOffset[x0][y0][1]) of the MVD.

TABLE 4

An exemplary relationship between MmvdSign[ x0 ][ y0 ] and mmvd_direction_idx[ x0 ][ y0 ]

| mmvd_direction_idx[ x0 ][ y0 ] | MmvdSign [ x0 ][ y0 ][0] | MmvdSign [ x0 ][ y0 ][1] |
|---|---|---|
| 0 | +1 | 0 |
| 1 | −1 | 0 |
| 2 | 0 | +1 |
| 3 | 0 | −1 |

The first component (e.g., MmvdOffset[x0][y0][0]) and the second component (e.g., MmvdOffset[x0][y0][1]) of the MVD or the offset MmvdOffset[x0][y0] can be derived as follows:

MmvdOffset[x0][y0][0]=(MmvdDistance[x0][y0]
    <<2)×MmvdSign[x0][y0][0]    Eq. 10

MmvdOffset[x0][y0][1]=(MmvdDistance[x0][y0]
    <<2)×MmvdSign[x0][y0][1]    Eq. 11

In an example, the distance index (e.g., mmvd_distance_idx[x0][y0]) is 3, and the direction index (e.g., mmvd_distance_idx[x0][y0]) is 2. Based on Table 4 and the direction index (e.g., mmvd_direction_idx[x0][y0]) being 2, the first sign (e.g., MmvdSign[x0][y0][0]) of the first component (e.g., $MVD_x$ or MmvdOffset[x0][y0][0]) of the MVD is 0, and the second sign (e.g., MmvdSign[x0][y0][1]) of the second component (e.g., $MVD_y$ or MmvdOffset[x0][y0][1]) of the MVD is "+1". In this example, the MVD is along the positive vertical direction (+y) and has no horizontal component.

When the full-pel MMVD flag (e.g., slice_fpel_mmvd_enabled_flag) is equal to 0 and the full-pel MMVD is off, based on Table 3 and the distance index (e.g., mmvd_distance_idx[x0][y0]) being 3, the motion magnitude indicated by MmvdDistance[x0][y0] is 8. Based on Eqs. 10-11, the first component (e.g., MmvdOffset[x0][y0][0]) of the MVD is (8<<2)×0=0, and the second component (e.g., MmvdOffset[x0][y0][1]) of the MVD is (8<<2)×(+1)=2 (luma samples).

When the full-pel MMVD flag (e.g., slice_fpel_mmvd_enabled_flag) is equal to 1 and the full-pel MMVD is on, based on Table 3 and the distance index (e.g., mmvd_distance_idx[x0][y0]) being 3, the motion magnitude indicated by MmvdDistance[x0][y0] is 32. Based on Eqs. 10-11, the first component (e.g., MmvdOffset[x0][y0][0]) of the MVD is (32<<2)×0=0, and the second component (e.g., MmvdOffset[x0][y0][1]) of the MVD is (32<<2)×(+1)=8 (luma samples).

The present disclosure includes embodiments related to improvements to signaling in an MMVD mode.

In an embodiment, when the BDOF mode and/or the DMVR mode are applied to a coding block in a bi-predicted picture (e.g., a B picture) that has both a forward reference picture and a backward reference picture, a coding efficiency improvement to the coding block in the bi-predicted picture by the MMVD mode may not be significant. Thus, in some examples, the MMVD mode is not applied to the coding block when the BDOF mode and/or the DMVR mode are applied to the coding block. On the other hand, in various examples, a MMVD merge flag of the coding block is signaled regardless of whether the MMVD mode is applied to the coding block. A signaling cost of signaling the MMVD merge flag of the coding block can be relatively large, for example, because the MMVD merge flag is signaled for the coding block when the MMVD mode is unlikely to be applied to the coding block.

According to an embodiment of the disclosure, the MMVD merge flag (e.g., indicated by a syntax element mmvd_merge_flag) may not be signaled for each block in a current picture. The MMVD merge flag can be conditionally signaled for a current block in the current picture based on whether one or more requirements are met. The requirements can include a first requirement and a second requirement. The first requirement can include that other inter prediction mode(s) (e.g., the BDOF mode and/or the DMVR mode) are allowed for a plurality of blocks that includes the current block. The second requirement can include that a high-level flag (e.g., an MMVD merge enabling flag) for the plurality of blocks indicates that the MMVD mode is not enabled for the plurality of blocks. In some embodiments, the first requirement further includes that reference pictures of the plurality of blocks include a forward reference picture and a backward reference picture. In some embodiments, the first requirement further includes that the reference pictures of the plurality of blocks are symmetric with respect to the current picture.

In an example, the MMVD merge flag (e.g., mmvd_merge_flag) can be conditionally signaled based on usage of the DMVR mode and/or the BDOF mode.

At a decoder side, prediction information of the plurality of blocks in the current picture can be decoded from a coded video bitstream. Whether at least one of the requirements is met can be determined based on the prediction information. In some embodiments, the requirements include (i) the first requirement (e.g., at least one of the DMVR mode or the BDOF mode is allowed for the plurality of blocks) and (ii) the second requirement (e.g., the MMVD merge enabling flag indicates that the MMVD mode is not enabled for the plurality of blocks). Whether a plurality of MMVD merge flags is inferred as false for the plurality of blocks can be determined based on whether at least one of the requirements is met. Each of the plurality of MMVD merge flags can indicate, for a corresponding one of the plurality of blocks, whether the MMVD mode is applied to that corresponding block. In response to a determination that the plurality of MMVD merge flags is inferred as false for the plurality of blocks, each block in the plurality of blocks can be reconstructed without applying the MMVD mode. As the plurality of MMVD merge flags of the plurality of blocks are not signaled (e.g., the plurality of MMVD merge flags is inferred to be false) in the coded video bitstream, the coding efficiency is improved.

In an example, the plurality of blocks is a slice in the current picture. In an example, the plurality of blocks is the current picture.

In an embodiment, the prediction information includes at least one flag indicating whether at least one of the DMVR mode or the BDOF mode is allowed for the plurality of blocks. For example, the prediction information includes a first slice level flag indicating whether the DMVR mode is allowed for the plurality of blocks in the slice (e.g., a current slice) of the current picture. For example, the prediction information includes a second slice level flag indicating whether the BDOF mode is allowed for the plurality of blocks in the slice.

In an embodiment, merge the first requirement requires that at least one of the DMVR mode or the BDOF mode is allowed for the plurality of blocks, reference pictures of the plurality of blocks include a forward reference picture and a backward reference picture, and an absolute value of a first picture order count (POC) difference between the forward reference picture and the current picture is equal to an absolute value of a second POC difference between the backward reference picture and the current picture. The plurality of MMVD merge flags of the plurality of blocks can be determined to be inferred as false, for example, based on the first requirement being met. In some examples, the first requirement further includes that the forward reference picture and the backward reference picture are short-term reference pictures. For example, the first requirement further includes that the absolute value of the first POC difference and the absolute value of the second POC difference are less than a threshold (e.g., 2). In an example, the threshold is 2.

In an embodiment, if the DMVR mode and/or the BDOF mode are allowed for the current slice (e.g., the plurality of blocks), the current slice has the forward reference picture and the backward reference picture, and the current picture is temporally in the middle of the two reference pictures (e.g., the forward reference picture and the backward reference picture), the MMVD mode is not allowed for the plurality of blocks and the MMVD merge flag (e.g., mmvd_merge_flag) of each block in the plurality of blocks is not signaled. The MMVD merge flag (e.g., mmvd_merge_flag) of each block in the plurality of blocks can be inferred as false.

Probability of use of the MMVD mode can depend on the absolute POC differences (e.g., the absolute value of the first POC difference and the absolute value of the second POC difference) between the two reference pictures and the current picture. In an embodiment, the probability of use of the MMVD mode decreases when the absolute POC differences decrease. In an example, a further constraint on temporal distances (e.g., the absolute POC differences) between the current picture and the two reference pictures may be further applied. For example, the absolute POC differences are less than 1 or 2.

According to an embodiment of the disclosure, the prediction information includes the single, high-level MMVD merge enabling flag corresponding to all block in the plurality of blocks. The single, high-level MMVD merge enabling flag can indicate whether the MMVD mode is enabled or is not enabled for the plurality of blocks. The plurality of MMVD merge flags corresponding to each of the plurality of blocks can be inferred based on the MMVD merge enabling flag. The MMVD merge enabling flag can be a high-level flag, such as a slice level flag (e.g., sh_mmvd_merge_enable_flag) at a slice header (SH). The MMVD merge enabling flag can be a high-level flag, such as a picture level flag (e.g., ph_mmvd_merge_enable_flag) at a picture header (PH).

In an embodiment, the MMVD merge enabling flag can indicate that the MMVD mode is not enabled for the plurality of blocks, which meets the second requirement. In this case, all of the plurality MMVD merge flags corresponding to each of the plurality of blocks can be inferred as false.

In an embodiment, the MMVD merge enabling flag can indicate that the MMVD mode is enabled for the plurality of blocks, which does not meet the second requirement. In this case, the plurality of MMVD merge flags is not inferred as false. Instead, the plurality of MMVD merge flags corresponding to each of the plurality of blocks can be signaled in the coded video bitstream and received at the decoder side.

In an example, the prediction information can indicate that: (i) at least one of the DMVR mode or the BDOF mode is allowed for the plurality of blocks, (ii) the reference pictures of the plurality of blocks include the forward reference picture and the backward reference picture, and (iii) the absolute value of the first POC difference between the forward reference picture and the current picture is equal to the absolute value of the second POC difference between the backward reference picture and the current picture. The plurality of MMVD merge flags is not inferred as false when the MMVD merge enabling flag indicates that the MMVD mode is enabled for the plurality of blocks.

The MMVD merge enabling flag at the slice header or the picture header can indicate whether the MMVD merge mode can be used or not for the coded slice (e.g., the current slice) corresponding to the slice header or the coded picture (e.g., the current picture) corresponding to the picture header.

In an embodiment, the MMVD merge flags (e.g., mmvd_merge_flag) are inferred as FALSE for all blocks in a slice if the MMVD merge enable flag (e.g., sh_mmvd_merge_enable_flag) at the slice header corresponding to the slice is FALSE.

In an embodiment, the MMVD merge flags (e.g., mmvd_merge_flag) are inferred as FALSE for all blocks in a picture if the MMVD merge enable flag (e.g., ph_mmvd_merge_enable_flag) at the picture header corresponding to the picture is FALSE.

In an embodiment, in response to a determination that the plurality of MMVD merge flags is not inferred as false for the plurality of blocks (for example, the blocks in a slice or the blocks in a picture), a separate respective MMVD merge flag of each block in the plurality of blocks can be signaled in the coded video bitstream. The plurality of MMVD merge flags can be coded using CABAC.

In related video coding technologies, a single context (e.g., referred to as an old context) is used during CABAC to code at least one MMVD merge flag in the plurality of MMVD merge flags. According to an embodiment of the disclosure, multiple contexts can be used to CABAC code (e.g., encode and/or decode) the at least one MMVD merge flag of the plurality of MMVD merge flags. In an example, multiple contexts are used in the CABAC to code (e.g., encode and/or decode) each MMVD merge flag of the plurality of MMVD merge flags. In an example, the multiple contexts include a first context and a second context. In an example, the second context is the old context used in the related video coding technologies, and the first context is a new context that is not used in the related video coding technologies. A context among the multiple contexts (e.g., the first context and the second context) can be selected based on whether one or more of the DMVR mode or the BDOF mode is allowed for the plurality of blocks. The respective MMVD merge flag of each block in the plurality of blocks can be coded (e.g., encoded and/or decoded) using the CABAC with the selected context.

In an embodiment, the prediction information indicates conditions to select the first context (e.g., the new context). The conditions can be identical to or different from the first requirement. In an example, the conditions are identical to the first requirement. For example, the conditions include: at least one of the DMVR mode or the BDOF mode is allowed for the plurality of blocks, the reference pictures of the plurality of blocks include the forward reference picture and the backward reference picture, and the absolute value of the first POC difference between the forward reference picture and the current picture is equal to the absolute value of the second POC difference between the backward reference picture and the current picture. When the conditions are satisfied, the first context can be selected as the context. The second context can be selected as the context based on one of the conditions is not satisfied.

In an example, when the first context (e.g., the new context) is selected to be the CABAC context, the first context is initialized with a probability indicating that each MMVD merge flag has a probability to be false that is higher than a probability that the MMVD merge flag is true.

In an embodiment, the first context (e.g., the new context) and the second context (e.g., the old context) are contexts used in CABAC coding of the MMVD merge flag (e.g., mmvd_merge_flag). The selection between the first context (e.g., the new context) and the second context (e.g., the old context) can be based on usage of the DMVR mode and/or the BDOF mode.

In an embodiment, the conditions to select between the first context and the second context are identical to the first requirement. If the conditions are satisfied (e.g., are true), the first context (e.g., the new context) is selected. Otherwise, the second context (e.g., the old context) is used.

In an embodiment, the first context (e.g., the new context) is initialized with a probability which indicates that the MMVD merge flag (e.g., mmvd_merge_flag) is more likely than not (e.g., the probability is higher than a probability that the MMVD merge flag is true) to be false when the first context (e.g., the new context) is selected.

Figure 13:
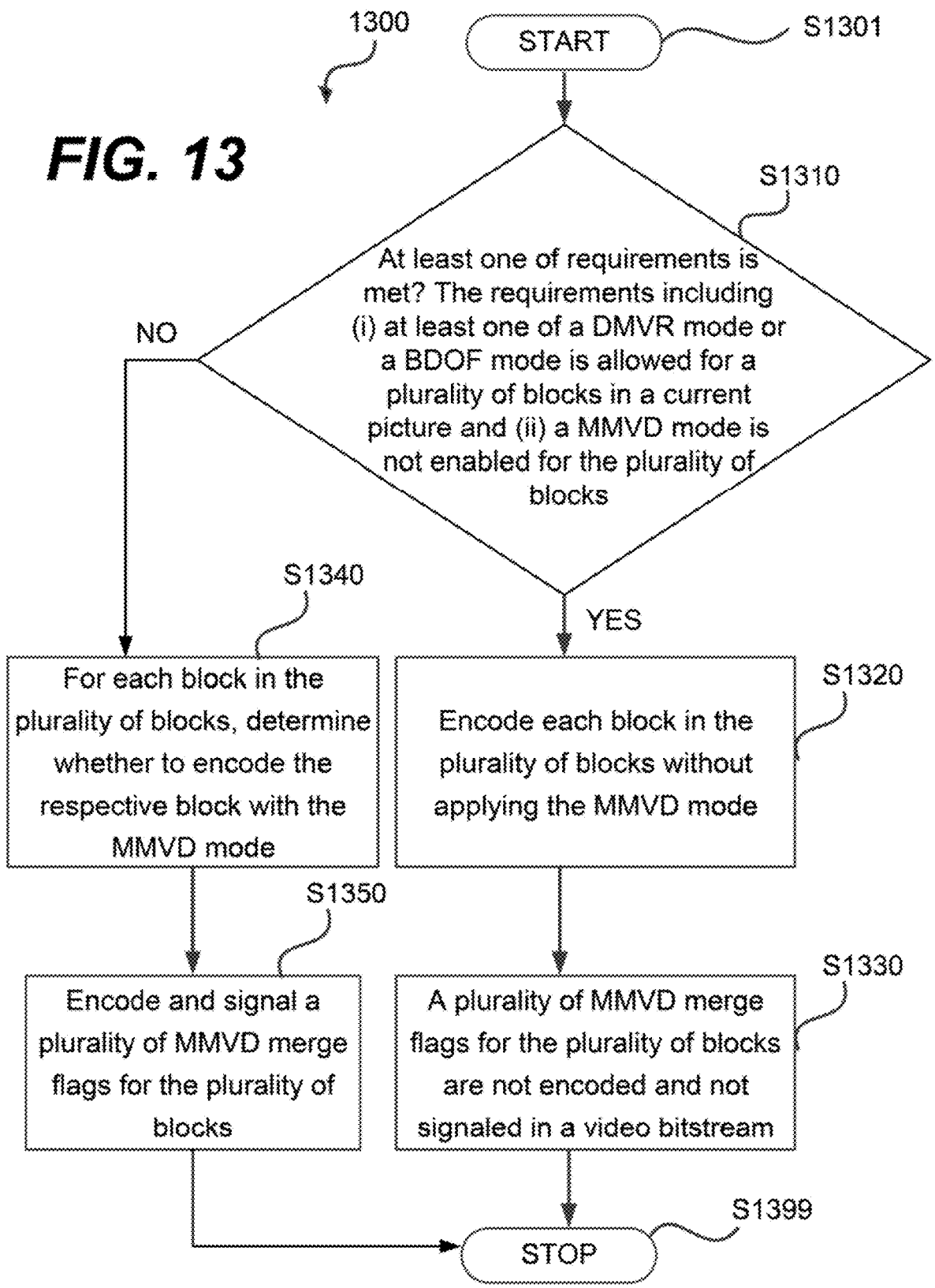
FIG. 13 shows a flow chart outlining an encoding process according to an embodiment of the disclosure.

FIG. 13 shows a flow chart outlining an encoding process (1300) according to an embodiment of the disclosure. In various embodiments, the process (1300) is executed by processing circuitry, such as the processing circuitry in the terminal devices (310), (320), (330) and (340), processing circuitry that performs functions of a video encoder (e.g., (403), (603), (703)), or the like. In some embodiments, the process (1300) is implemented in software instructions, thus when the processing circuitry executes the software instructions, the processing circuitry performs the process (1300). The process starts at (S1301), and proceeds to (S1310).

At (S1310), whether at least one requirement is met can be determined. The requirements can include a first requirement and a second requirement. The first requirement can include that at least one of a DMVR mode or a BDOF mode is allowed for a plurality of blocks in a current picture. The first requirement can further include additional requirement(s). For example, the first requirement includes that (i) reference pictures of the plurality of blocks include a forward reference picture and a backward reference picture and (ii) an absolute value of a first picture order count (POC) difference between the forward reference picture and the current picture is equal to an absolute value of a second POC difference between the backward reference picture and the current picture. The second requirement can include that a MMVD mode is not enabled for the plurality of blocks.

When at least one of the requirements is met, the process (1300) proceeds to (S1320). When none of the requirements is met, the process (1300) proceeds to (S1340).

At (S1320), each block in the plurality of blocks can be encoded without applying the MMVD mode when the at least one of the requirements is met.

In an example, the first requirement further includes that the reference pictures of the plurality of blocks include the forward reference picture and the backward reference picture and the absolute value of the first POC difference is equal to the absolute value of the second POC difference. The first requirement is met. Each block in the plurality of blocks can be encoded without applying the MMVD mode.

In an example, the second requirement (e.g., the MMVD mode is not enabled for the plurality of blocks) is met, and each block in the plurality of blocks can be encoded without applying the MMVD mode.

As part of the branch including (S1320), the process (1300) proceeds to (S1330).

At (S1330), a plurality of MMVD merge flags for the plurality of blocks is not encoded and is not signaled in a video bitstream. In an example, the MMVD mode is not enabled for the plurality of blocks, and thus a flag, such as a high-level flag (e.g., a MMVD merge enabling flag), is encoded and signaled in the bitstream to indicate that the MMVD mode is not enabled for the plurality of blocks.

In an example, the first requirement is met, and no high-level flag (e.g., the MMVD merge enabling flag) is signaled. A decoder can infer that the plurality of MMVD merge flags for the plurality of blocks is false based on the first requirement being met.

The process (1300) then proceeds to (S1399), and terminates.

At (S1340), a separate determination is made for each block in the plurality of blocks as to whether to encode the respective block with the MMVD mode and encode the respective block according to the determination.

In an example, the MMVD mode is determined to be applied to the respective block, and the respective block is encoded by applying the MMVD mode.

In another example, the MMVD mode is determined not to be applied to the respective block, and the respective block is encoded without applying the MMVD mode.

As part of the branch including (S1340), the process (1300) proceeds to (S1350).

At (S1350), the plurality of MMVD merge flags for the plurality of blocks are encoded and signaled in the video bitstream, where each of the plurality of the encoded and signaled MMVD merge flags indicate a respective block in the plurality of blocks was determined to be encoded with the MMVD mode.

In an example, the MMVD mode is enabled for the plurality of blocks, and thus the MMVD merge enabling flag is encoded and signaled in the video bitstream to indicate that the MMVD mode is enabled for the plurality of blocks.

After step (S1350), the process (1300) proceeds to (S1399), and terminates.

The process (1300) can be suitably adapted to various scenarios and steps in the process (1300) can be adjusted accordingly. One or more of the steps in the process (1300) can be adapted, omitted, repeated, and/or combined. Any suitable order can be used to implement the process (1300). Additional step(s) can be added.

In an embodiment, the first requirement is met and the second requirement is not met. In an example shown in FIG. 13, the process (1300) proceeds to the branch including (S1320) and (S1330) where each block in the plurality of blocks can be encoded without applying the MMVD mode (S1320) and the plurality of MMVD merge flags are not encoded and are not signaled (S1320).

Alternatively (not shown in FIG. 13), when the first requirement is met and the second requirement is not met where the MMVD mode is enabled for the plurality of blocks, the process (1300) can proceed to the branch including (S1340) and (S1350). For example, whether to encode the respective block with the MMVD mode can be determined for each block in the plurality of blocks. The plurality of MMVD merge flags can be encoded and signaled in the bitstream. Further, the MMVD merge enable flag can be encoded and signaled.

Figure 14:
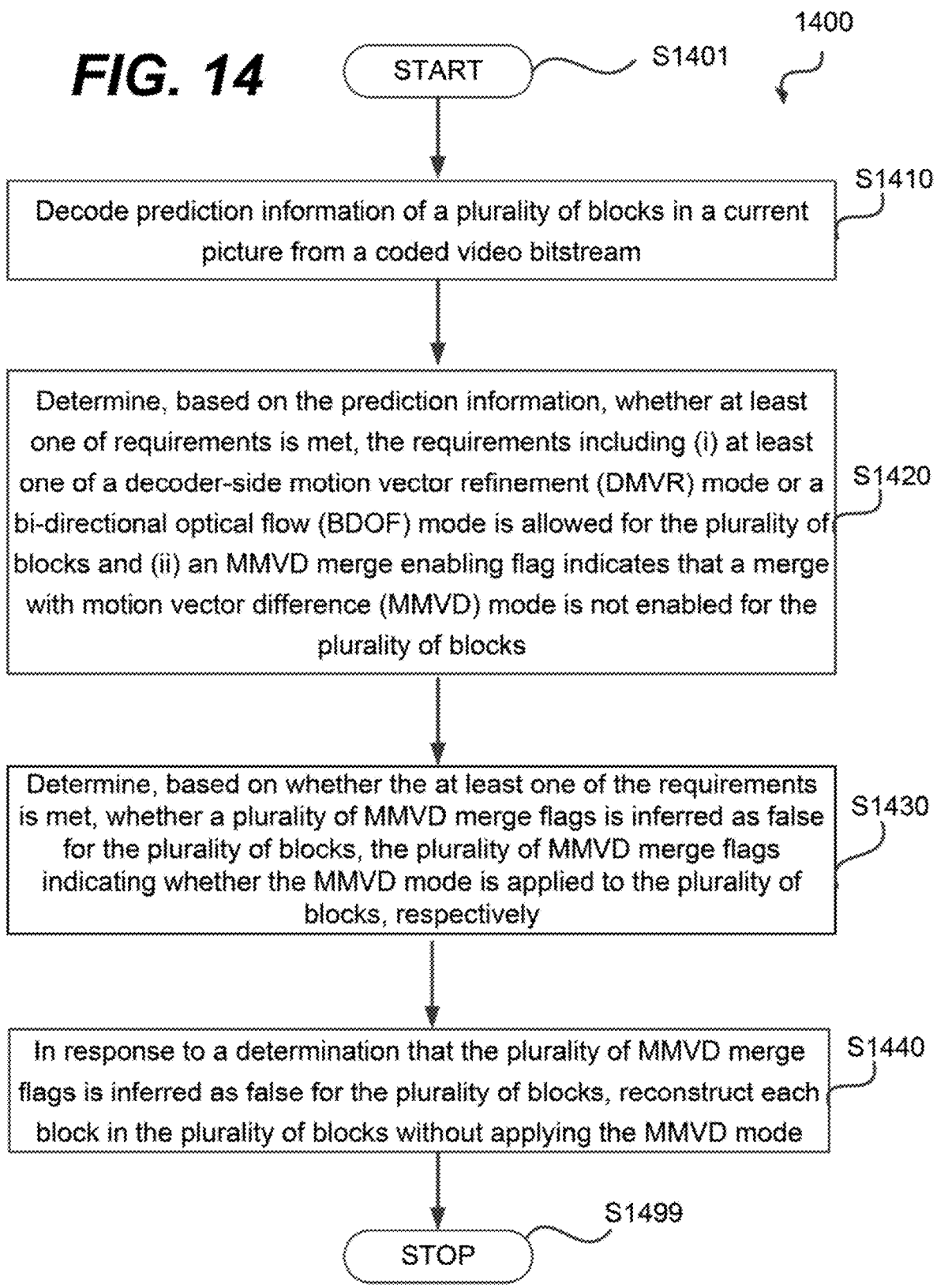
FIG. 14 shows a flow chart outlining a decoding process according to an embodiment of the disclosure.

FIG. 14 shows a flow chart outlining a decoding process (1400) according to an embodiment of the disclosure. In various embodiments, the process (1400) is executed by processing circuitry, such as the processing circuitry in the terminal devices (310), (320), (330) and (340), the processing circuitry that performs functions of the video encoder (403), the processing circuitry that performs functions of the video decoder (410), the processing circuitry that performs functions of the video decoder (510), the processing circuitry that performs functions of the video encoder (603), and the like. In some embodiments, the process (1400) is implemented in software instructions, thus when the processing circuitry executes the software instructions, the processing circuitry performs the process (1400). The process starts at (S1401), and proceeds to (S1410).

At (S1410), prediction information of a plurality of blocks in a current picture can be decoded from a coded video bitstream. The plurality of blocks can be a slice in the current picture. The plurality of blocks can be the current picture.

At (S1420), whether at least one requirement is met can be determined based on the prediction information. The requirements can include (i) a first requirement (e.g., at least one of a decoder-side motion vector refinement (DMVR) mode or a bi-directional optical flow (BDOF) mode is allowed for the plurality of blocks) and (ii) a second requirement (e.g., an MMVD merge enabling flag indicates that a merge with motion vector difference (MMVD) mode is not enabled for the plurality of blocks).

In an embodiment, the prediction information includes one or more flags indicating whether at least one of the DMVR mode or the BDOF mode is allowed for the plurality of blocks. The one or more flags can include high-level flag(s). In an example, the one or more flags include (i) a slice level flag indicating whether the DMVR mode is allowed for the slice and/or (ii) a slice level flag indicating whether the BDOF mode is allowed for the slice.

At (S1430), whether a plurality of MMVD merge flags is inferred as false for the plurality of blocks can be determined based on whether at least one of the requirements is met. Each of the plurality of MMVD merge flags can indicate whether the MMVD mode is applied to a corresponding block in the plurality of blocks, respectively.

In an embodiment, the first requirement includes: (i) at least one of the DMVR mode or the BDOF mode is allowed for the plurality of blocks, (ii) reference pictures of the plurality of blocks include a forward reference picture and a backward reference picture, and (iii) an absolute value of a first picture order count (POC) difference between the forward reference picture and the current picture is equal to an absolute value of a second POC difference between the backward reference picture and the current picture. That the plurality of MMVD merge flags of the plurality of blocks is inferred as false can be determined, for example, when the first requirement is met. In an example, the plurality of MMVD merge flags of the plurality of blocks is not signaled when the first requirement is met.

In an example, the first requirement further includes that the absolute value of the first POC difference and the absolute value of the second POC difference are less than a threshold. The threshold can be 2.

In an embodiment, the prediction information includes the MMVD merge enabling flag of the plurality of blocks. The MMVD merge enabling flag can be a high-level flag (e.g., higher than a block), such as a slice level flag at a slice header, a picture level flag at a picture header, or the like.

In an example, the MMVD merge enabling flag indicates that the MMVD mode is not enabled for the plurality of blocks, which meets the second requirement. That the plurality MMVD merge flags of the plurality of blocks is inferred as false can be determined, for example, when the second requirement is met (e.g., the MMVD merge enabling flag indicates that the MMVD mode is not enabled for the plurality of blocks).

At (S1440), in response to a determination that the plurality of MMVD merge flags is inferred as false for the plurality of blocks, each block in the plurality of blocks can be reconstructed without applying the MMVD mode. In an example, the DMVR mode and/or the BDOF mode is applied to one or more blocks in the plurality of blocks, and the one or more blocks in the plurality of blocks are reconstructed using the DMVR mode and/or the BDOF mode. Because the plurality of MMVD merge flags is inferred as false, the MMVD merge flags are not signaled in the coded video bitstream.

In an embodiment, an alternative step (not shown) to (S1440) is performed in response to a determination that the plurality of MMVD merge flags is not inferred as false. In this alternative step, the plurality of MMVD merge flags is signaled in the coded video bitstream. If a first MMVD merge flag in the plurality of MMVD merge flags that is signaled in the coded video bitstream indicates that the MMVD mode is applied to a first block in the plurality of blocks, the first block in the plurality of blocks can be reconstructed by applying the MMVD mode. If a second MMVD merge flag in the plurality of MMVD merge flags that is signaled in the coded video bitstream indicates that the MMVD mode is not applied to a second block in the plurality of blocks, the second block in the plurality of blocks can be reconstructed without applying the MMVD mode.

After (S1440) or the alternative step, the process (1400) proceeds to (S1499), and terminates.

The process (1400) can be suitably adapted to various scenarios and steps in the process (1400) can be adjusted accordingly. One or more of the steps in the process (1400) can be adapted, omitted, repeated, and/or combined. Any suitable order can be used to implement the process (1400). Additional step(s) can be added.

In an embodiment, in response to a determination that the plurality of MMVD merge flags is not inferred as false for the plurality of blocks, a respective MMVD merge flag of each block in the plurality of blocks can be signaled in the coded video bitstream. A context can be selected among a first context and a second context based on whether one or more of the DMVR mode or the BDOF mode is allowed for the plurality of blocks. The respective MMVD merge flag of each block in the plurality of blocks can be decoded using context-adaptive binary arithmetic coding (CABAC) with the selected context.

In an example, the prediction information indicates whether conditions to select the first context are met. The conditions include: (i) one or more of the DMVR mode or the BDOF mode is allowed for the plurality of blocks, (ii) the reference pictures of the plurality of blocks include the forward reference picture and the backward reference picture, and (iii) the absolute value of the first POC difference between the forward reference picture and the current picture is equal to the absolute value of the second POC difference between the backward reference picture and the current picture. The first context can be selected as the context based on the conditions being satisfied. The second context can be selected as the context based on one of the conditions not being satisfied.

In an example, the first context is initialized with a probability indicating that the MMVD merge flag of each block in the plurality of blocks has a probability to be false that is higher than a probability that the MMVD merge flag is true.

In an example, the prediction information includes the MMVD merge enabling flag of the plurality of blocks, and the MMVD merge enabling flag indicates that the MMVD mode is enabled for the plurality of blocks, which does not meet the second requirement. When the second requirement is not met (e.g., the MMVD merge enabling flag indicates that the MMVD mode is enabled for the plurality of blocks), it is determined that the plurality of MMVD merge flags is not inferred as false and that the plurality of MMVD merge flags of the plurality of blocks is signaled in the coded video bitstream.

In an example not shown in FIG. 14, regardless of whether the first requirement is met (e.g., the prediction information indicates that: (i) at least one of the DMVR mode or the BDOF mode is allowed for the plurality of blocks, (ii) the reference pictures of the plurality of blocks include the forward reference picture and the backward reference picture, and (iii) the absolute value of the first POC difference between the forward reference picture and the current picture is equal to the absolute value of the second POC difference between the backward reference picture and the current picture), the plurality of MMVD merge flags is not inferred as false and is signaled in the coded video bitstream, for example, when the second requirement is not met (e.g., the MMVD merge enabling flag indicates that the MMVD mode is enabled for the plurality of blocks).

In some embodiments, the prediction information of the plurality of blocks in the current picture is received from the coded video bitstream. Whether at least one of the DMVR mode or the BDOF mode is allowed for the plurality of blocks can be determined based on the prediction information. In response to a determination that at least one of the DMVR mode or the BDOF mode is allowed for the plurality of blocks, the plurality of MMVD merge flags can be inferred as false for the plurality of blocks where the plurality of MMVD merge flags indicates whether the MMVD mode is applied to the plurality of blocks, respectively. In response to a determination that the plurality of MMVD merge flags is inferred as false for the plurality of blocks, each block in the plurality of blocks can be reconstructed without applying the MMVD mode.

In an embodiment, (i) the current picture refers to a forward reference picture and a backward reference picture, and (ii) the current picture is in the middle of the forward reference picture and the backward reference picture. Based on conditions (i) and (ii), the plurality of MMVD merge flags is determined as not signaled. Accordingly, the plurality of MMVD merge flags can be inferred based on a determination that the MMVD mode is not allowed in the current picture.

In an embodiment, the prediction information includes a MMVD merge enabling flag of the plurality of blocks. The MMVD merge enabling flag indicates that the MMVD mode is not enabled for the plurality of blocks, and the plurality MMVD merge flags of the plurality of blocks is inferred as false.

Embodiments in the disclosure may be used separately or combined in any order. Further, each of the methods (or embodiments), an encoder, and a decoder may be implemented by processing circuitry (e.g., one or more processors or one or more integrated circuits). In one example, the one or more processors execute a program that is stored in a non-transitory computer-readable medium.

The techniques described above can be implemented as computer software using computer-readable instructions and physically stored in one or more computer-readable media. For example, FIG. 15 shows a computer system (1500) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 15:
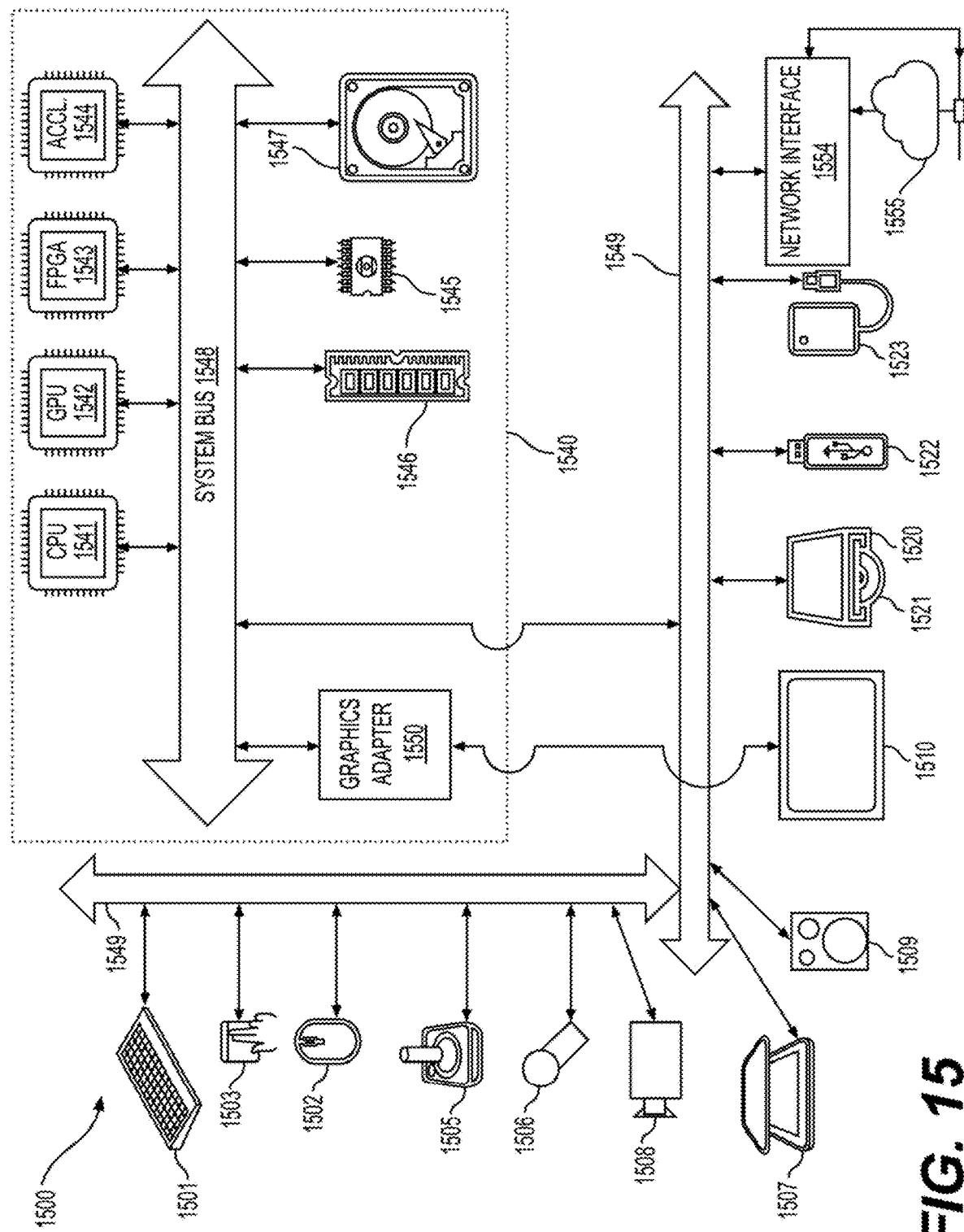
FIG. 15 is a schematic illustration of a computer system in accordance with an embodiment.

The components shown in FIG. 15 for computer system (1500) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1500).

Computer system (1500) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1501), mouse (1502), trackpad (1503), touch-screen (1510), data-glove (not shown), joystick (1505), microphone (1506), scanner (1507), camera (1508).

Computer system (1500) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1510), data-glove (not shown), or joystick (1505), but there can also be tactile feedback devices that do not serve as input devices), audio output devices (such as: speakers (1509), headphones (not depicted)), visual output devices (such as screens (1510) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1500) can also include human accessible storage devices and their associated media such as optical media including CD/DVD ROM/RW (1520) with CD/DVD or the like media (1521), thumb-drive (1522), removable hard drive or solid state drive (1523), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1500) can also include an interface (1554) to one or more communication networks (1555). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1549) (such as, for example USB ports of the computer system (1500)); others are commonly integrated into the core of the computer system (1500) by attachment to a system bus as described below (for example Ethernet interface into a PC computer system or cellular network interface into a smartphone computer system). Using any of these networks, computer system (1500) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1540) of the computer system (1500).

The core (1540) can include one or more Central Processing Units (CPU) (1541), Graphics Processing Units (GPU) (1542), specialized programmable processing units in the form of Field Programmable Gate Areas (FPGA) (1543), hardware accelerators for certain tasks (1544), graphics adapters (1550), and so forth. These devices, along with Read-only memory (ROM) (1545), Random-access memory (1546), internal mass storage such as internal non-user accessible hard drives, SSDs, and the like (1547), may be connected through a system bus (1548). In some computer systems, the system bus (1548) can be accessible in the form of one or more physical plugs to enable extensions by additional CPUs, GPU, and the like. The peripheral devices can be attached either directly to the core's system bus (1548), or through a peripheral bus (1549). In an example, the screen (1510) can be connected to the graphics adapter (1550). Architectures for a peripheral bus include PCI, USB, and the like.

CPUs (1541), GPUs (1542), FPGAs (1543), and accelerators (1544) can execute certain instructions that, in combination, can make up the aforementioned computer code. That computer code can be stored in ROM (1545) or RAM (1546). Transitional data can be stored in RAM (1546), whereas permanent data can be stored for example, in the internal mass storage (1547). Fast storage and retrieve to any of the memory devices can be enabled through the use of cache memory, that can be closely associated with one or more CPU (1541), GPU (1542), mass storage (1547), ROM (1545), RAM (1546), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1500), and specifically the core (1540) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1540) that are of non-transitory nature, such as core-internal mass storage (1547) or ROM (1545). The software implementing various embodiments of the present disclosure can be stored in such devices and executed by core (1540). A computer-readable medium can include one or more memory devices or chips, according to particular needs. The software can cause the core (1540) and specifically the processors therein (including CPU, GPU, FPGA, and the like) to execute particular processes or particular parts of particular processes described herein, including defining data structures stored in RAM (1546) and modifying such data structures according to the processes defined by the software. In addition or as an alternative, the computer system can provide functionality as a result of logic hardwired or otherwise embodied in a circuit (for example: accelerator (1544)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit
R-D: Rate-Distortion While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video decoding in a video decoder, comprising:
   receiving prediction information of a plurality of blocks in a current picture from a coded video bitstream;
   determining, based on the prediction information, that at least one of a decoder-side motion vector refinement (DMVR) mode or a bi-directional optical flow (BDOF) mode is allowed for the plurality of blocks;
   in response to the determination that the at least one of the DMVR mode or the BDOF mode is allowed for the plurality of blocks, determining that a plurality of merge with motion vector difference (MMVD) merge flags is inferred as false to indicate that an MMVD mode is not applied for the plurality of blocks; and
   in response to the determination that the plurality of MMVD merge flags is inferred as false for the plurality of blocks, reconstructing each block in the plurality of blocks without applying the MMVD mode.

2. The method of claim 1, wherein the prediction information includes at least one flag indicating whether the at least one of the DMVR mode or the BDOF mode is allowed for the plurality of blocks.

3. The method of claim 2, further comprising:
   determining that (i) the current picture refers to a forward reference picture and a backward reference picture, and (ii) the current picture is in the middle of the forward reference picture and the backward reference picture;
   determining that the plurality of MMVD merge flags is not signaled; and
   inferring the plurality of MMVD merge flags based on a determination that the MMVD mode is not allowed in the current picture.

4. The method of claim 3, wherein the determination that the current picture is in the middle of the forward reference picture and the backward reference picture includes determining that an absolute value of a first picture order count (POC) difference between the forward reference picture and the current picture is equal to an absolute value of a second POC difference between the backward reference picture and the current picture.

5. The method of claim 4, wherein the absolute value of the first POC difference and the absolute value of the second POC difference are less than a threshold.

6. The method of claim 1, wherein
   the prediction information includes a MMVD merge enabling flag of the plurality of blocks,
   the MMVD merge enabling flag indicates that the MMVD mode is not enabled for the plurality of blocks, and
   the method includes determining that the plurality MMVD merge flags of the plurality of blocks is inferred as false.

7. The method of claim 1, wherein the plurality of blocks is a slice in the current picture.

8. The method of claim 1, wherein
   in response to a determination that the plurality of MMVD merge flags is not inferred as false for the plurality of blocks, a respective MMVD merge flag of each block in the plurality of blocks is signaled in the coded video bitstream, and
   the method further comprises:
     selecting a context among a first context and a second context based on whether one or more of the DMVR mode or the BDOF mode is allowed for the plurality of blocks, and
     decoding the respective MMVD merge flag of each block in the plurality of blocks using context-adaptive binary arithmetic coding (CABAC) with the selected context.

9. The method of claim 8, wherein
   the prediction information indicates whether conditions to select the first context are met,
   the conditions include:
     the one or more of the DMVR mode or the BDOF mode is allowed for the plurality of blocks,
     reference pictures of the plurality of blocks include a forward reference picture and a backward reference picture, and
     an absolute value of a first picture order count (POC) difference between the forward reference picture and the current picture is equal to an absolute value of a second POC difference between the backward reference picture and the current picture, and the selecting the context includes:
     selecting the first context as the context based on the conditions being satisfied; and
     selecting the second context as the context based on one of the conditions not being satisfied.

10. The method of claim 9, wherein
    the first context is initialized with a probability indicating that the MMVD merge flag of each block in the plurality of blocks has a probability to be false that is higher than a probability that the MMVD merge flag is true.

11. An apparatus for video decoding, comprising:
    processing circuitry configured to:
      receive prediction information of a plurality of blocks in a current picture from a coded video bitstream;
      determine, based on the prediction information, that at least one of a decoder-side motion vector refinement (DMVR) mode or a bi-directional optical flow (BDOF) mode is allowed for the plurality of blocks;
      in response to the determination that the at least one of the DMVR mode or the BDOF mode is allowed for the plurality of blocks, determine that a plurality of merge with motion vector difference (MMVD) merge flags is inferred as false to indicate that an MMVD mode is not applied for the plurality of blocks; and in response to the determination that the plurality of MMVD merge flags is inferred as false for the plurality of blocks, reconstruct each block in the plurality of blocks without applying the MMVD mode.

12. The apparatus of claim 11, wherein the prediction information includes at least one flag indicating whether the at least one of the DMVR mode or the BDOF mode is allowed for the plurality of blocks.

13. The apparatus of claim 12, wherein the processing circuitry is configured to:
determine that (i) the current picture refers to a forward reference picture and a backward reference picture, and (ii) the current picture is in the middle of the forward reference picture and the backward reference picture;
determine that the plurality of MMVD merge flags is not signaled; and
infer the plurality of MMVD merge flags based on a determination that the MMVD mode is not allowed in the current picture.

14. The apparatus of claim 13, wherein the processing circuitry is configured to:
determine that an absolute value of a first picture order count (POC) difference between the forward reference picture and the current picture is equal to an absolute value of a second POC difference between the backward reference picture and the current picture.

15. The apparatus of claim 11, wherein
the prediction information includes a MMVD merge enabling flag of the plurality of blocks,
the MMVD merge enabling flag indicates that the MMVD mode is not enabled for the plurality of blocks, and
the processing circuitry is configured to determine that the plurality MMVD merge flags of the plurality of blocks is inferred as false.

16. The apparatus of claim 11, wherein the plurality of blocks is a slice in the current picture.

17. The apparatus of claim 11, wherein
in response to a determination that the plurality of MMVD merge flags is not inferred as false for the plurality of blocks, a respective MMVD merge flag of each block in the plurality of blocks is signaled in the coded video bitstream, and
the processing circuitry is configured to:
select a context among a first context and a second context based on whether one or more of the DMVR mode or the BDOF mode is allowed for the plurality of blocks, and
decode the respective MMVD merge flag of each block in the plurality of blocks using context-adaptive binary arithmetic coding (CABAC) with the selected context.

18. The apparatus of claim 17, wherein
the prediction information indicates whether conditions to select the first context are met, the conditions include:
the one or more of the DMVR mode or the BDOF mode is allowed for the plurality of blocks,
reference pictures of the plurality of blocks include a forward reference picture and a backward reference picture, and
an absolute value of a first picture order count (POC) difference between the forward reference picture and the current picture is equal to an absolute value of a second POC difference between the backward reference picture and the current picture, and the processing circuitry is configured to:
select the first context as the context based on the conditions being satisfied; and
select the second context as the context based on one of the conditions not being satisfied.

19. The apparatus of claim 18, wherein
the first context is initialized with a probability indicating that the MMVD merge flag of each block in the plurality of blocks has a probability to be false that is higher than a probability that the MMVD merge flag is true.

20. A non-transitory computer-readable storage medium storing a program executable by at least one processor to perform:
receiving prediction information of a plurality of blocks in a current picture from a coded video bitstream;
determining, based on the prediction information, that at least one of a decoder-side motion vector refinement (DMVR) mode or a bi-directional optical flow (BDOF) mode is allowed for the plurality of blocks;
in response to the determination that the at least one of the DMVR mode or the BDOF mode is allowed for the plurality of blocks, determining that a plurality of merge with motion vector difference (MMVD) merge flags is inferred as false to indicate that an MMVD mode is not applied for the plurality of blocks; and
in response to the determination that the plurality of MMVD merge flags is inferred as false for the plurality of blocks, reconstructing each block in the plurality of blocks without applying the MMVD mode.

* * * * *